(12) United States Patent
Schwarz et al.

(10) Patent No.: US 11,520,314 B2
(45) Date of Patent: Dec. 6, 2022

(54) CONTROL OF MANUFACTURING PROCESSES IN METAL PROCESSING INDUSTRY

(71) Applicant: TRUMPF Werkzeugmaschinen GmbH + Co. KG, Ditzingen (DE)

(72) Inventors: Benjamin Schwarz, Muenchingen (DE); Jens Ottnad, Karlsruhe (DE); Manuel Kiefer, Sinsheim (DE); Korbinian Weiss, Stuttgart (DE); Ulrich Schneider, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 686 days.

(21) Appl. No.: 16/388,336

(22) Filed: Apr. 18, 2019

(65) Prior Publication Data

US 2019/0243345 A1 Aug. 8, 2019

Related U.S. Application Data

(63) Continuation of application No. PCT/EP2017/076869, filed on Oct. 20, 2017.

(30) Foreign Application Priority Data

Oct. 21, 2016 (DE) .......................... 102016120132.4
Sep. 5, 2017 (DE) .......................... 102017120378.8

(51) Int. Cl.
*G05B 19/418* (2006.01)

(52) U.S. Cl.
CPC ..................... *G05B 19/4183* (2013.01); *G05B 2219/40543* (2013.01); *Y02P 90/02* (2015.11)

(58) Field of Classification Search
CPC .................. G05B 2219/40543; G05B 19/4183
(Continued)

(56) References Cited

U.S. PATENT DOCUMENTS 7,356,378 B1  4/2008  Huang et al.
10,031,511 B2  7/2018  Lukosz et al.
(Continued)

FOREIGN PATENT DOCUMENTS

CN    1426546 A    6/2003
CN    1447934 A    10/2003
(Continued)

OTHER PUBLICATIONS

CN Office Action in Chinese Appln. No. 201780065281.0, dated Nov. 2, 2021, 40 pages (with English translation).
(Continued)

*Primary Examiner* — Hien D Khuu
(74) *Attorney, Agent, or Firm* — Fish & Richardson P.C.

(57) ABSTRACT

Disclosed is an interior tracking system for manufacturing control. The interior tracking system has multiple, fixedly installed transceivers for determining the position of multiple mobile units, the position being determined in particular by evaluating the propagation time of electromagnetic (radio) signals. The interior tracking system is used to assign one of the mobile units to one or more workpieces in an industrial manufacturing plant that processes steel and/or sheet metal, to determine the position of the assigned workpieces by localizing the assigned mobile unit using the interior tracking system and to integrate the interior tracking system into a manufacturing control system of the industrial manufacturing plant.

18 Claims, 6 Drawing Sheets

(58) Field of Classification Search
USPC .......................................................... 700/116
See application file for complete search history.

(56) References Cited

U.S. PATENT DOCUMENTS

| | | | |
|---|---|---|---|
| 10,537,143 B2 | 1/2020 | Guenther et al. | |
| 2004/0102864 A1* | 5/2004 | Stack | A24C 5/345 |
| | | | 700/110 |
| 2006/0187028 A1 | 8/2006 | Kiang et al. | |
| 2007/0135962 A1 | 6/2007 | Kawabe et al. | |
| 2008/0030359 A1 | 2/2008 | Smith et al. | |
| 2008/0065243 A1 | 3/2008 | Fallman et al. | |
| 2010/0271263 A1* | 10/2010 | Moshfeghi | A63F 13/216 |
| | | | 342/378 |
| 2011/0035952 A1 | 2/2011 | Roithmeier | |
| 2011/0084841 A1* | 4/2011 | Gyorfi | H04B 5/0062 |
| | | | 340/572.4 |
| 2012/0290121 A1 | 11/2012 | Gronbach et al. | |
| 2013/0184002 A1 | 7/2013 | Moshfeghi | |
| 2013/0211291 A1 | 8/2013 | Tran | |
| 2013/0233922 A1* | 9/2013 | Schoening | G06Q 10/063114 |
| | | | 235/385 |
| 2014/0022093 A1 | 1/2014 | Hubauer et al. | |
| 2014/0188432 A1 | 7/2014 | Aljadeff et al. | |
| 2014/0330433 A1 | 11/2014 | Ciarelli et al. | |
| 2015/0106053 A1* | 4/2015 | Ocal | G01C 15/00 |
| | | | 702/150 |
| 2015/0356332 A1 | 12/2015 | Turner et al. | |
| 2016/0041580 A1 | 2/2016 | Inoue et al. | |
| 2016/0048122 A1 | 2/2016 | Lukosz et al. | |
| 2016/0062345 A1 | 3/2016 | Stubbs et al. | |
| 2016/0100289 A1 | 4/2016 | Mayorchik et al. | |
| 2016/0266653 A1 | 9/2016 | Liu et al. | |
| 2016/0307459 A1 | 10/2016 | Chestnut et al. | |
| 2017/0022015 A1 | 1/2017 | Gollu | |
| 2017/0064667 A1 | 3/2017 | Mycek et al. | |
| 2017/0278052 A1 | 9/2017 | Brady | |
| 2018/0006356 A1 | 1/2018 | McAllister | |
| 2019/0026690 A1* | 1/2019 | Wappler | G06Q 10/02 |
| 2019/0033836 A1 | 1/2019 | Van Leuven et al. | |
| 2019/0056707 A1 | 2/2019 | Pollard et al. | |
| 2019/0236507 A1 | 8/2019 | Bauer et al. | |
| 2019/0240703 A1 | 8/2019 | Kiefer et al. | |
| 2019/0243343 A1 | 8/2019 | Kiefer et al. | |
| 2019/0244309 A1 | 8/2019 | Ottnad et al. | |
| 2020/0113258 A1 | 4/2020 | Guenther et al. | |

FOREIGN PATENT DOCUMENTS

| | | | |
|---|---|---|---|
| CN | 102866677 A | 1/2013 | |
| CN | 102981616 A | 3/2013 | |
| CN | 104221035 A | 12/2014 | |
| CN | 204425655 U | 6/2015 | |
| DE | 3832375 | 3/1990 | G07C 9/00 |
| DE | 4306209 | 9/1994 | G06K 7/08 |
| DE | 10248142 | 7/2004 | G06K 1/12 |
| DE | 10 2007 045 381 * | 4/2008 | |
| DE | 102007045381 | 4/2008 | G01S 13/06 |
| DE | 102013018703 | 5/2014 | G01S 5/26 |
| DE | 10 2013 001 987 * | 8/2014 | |
| DE | 102013001987 | 8/2014 | |
| DE | 102014217568 | 2/2016 | |
| DE | 102015111506 | 4/2016 | |
| DE | 202016106352 | 1/2017 | G08C 23/00 |
| DE | 102016120131 | 4/2018 | B23Q 7/12 |
| DE | 102016120132 | 4/2018 | B23Q 17/24 |
| DE | 102016220015 | 4/2018 | G06Q 50/04 |
| DE | 102017107357 | 4/2018 | B07C 7/02 |
| EP | 1719030 | 11/2006 | |
| JP | 2007-164379 | 2/1997 | |
| JP | H10-236614 | 9/1998 | |
| JP | 2004-258855 | 9/2004 | |
| JP | 2005-309545 | 11/2005 | |
| JP | 2009-075941 | 4/2009 | |
| JP | 2009-129056 | 6/2009 | |
| JP | 2010-108149 | 5/2010 | |
| JP | 2015-228123 | 12/2015 | |
| JP | 2016-052919 | 4/2016 | |
| JP | 2016-075969 | 5/2016 | |
| JP | 2012-218037 | 11/2021 | |
| KR | 10-2012-0049600 | 5/2012 | |
| KR | 10-2014-0027225 | 3/2014 | |
| KR | 10-2015-0143724 | 12/2015 | |
| WO | WO 0249379 * | 6/2002 | |
| WO | WO 2005/078543 | 8/2005 | G05B 19/418 |
| WO | WO/2014/028959 | 2/2014 | |
| WO | WO 2016/033233 | 3/2016 | G05B 19/042 |

OTHER PUBLICATIONS

CN Office Action in Chinese Appln. No. 201780064850.X, dated Nov. 11, 2021, 34 pages (with English translation).
[No Author], "Pozyz: accurate indoor positioning for Arduion-Use Arduino for Projects" Dec. 21, 215, 4 pages.
EP Office Action by European Appln. No. 17800395.0, dated Apr. 22, 2021, 15 pages (with English translation).
EP Office Action by European Appln. No. 17800396.8, dated May 18, 2021, 23 pages (with English translation).
U.S. Office Action in U.S. Appl. No. 16/388,166, dated Mar. 30, 2021, 36 pages.
JP Japanese Office Action in Japanese Appln. No. 2019-520985, dated Aug. 10, 2021, 12 pages (with English translation).
JP Japanese Office Action in Japanese Appln. No. 2019-520986, dated Aug. 31, 2021, 17 pages (with English translation).
German Office Action for German Application No. DE 10 2017 120 383.4, dated Jul. 5, 2018 (with English Translation).
German Office Action for German Application No. DE 10 2017 120 378.8, dated May 4, 2018 (with English Translation).
The International Search Report and Written Opinion for International Application No. PCT/EP2017/076869 dated Jun. 20, 2018.
"Measurement of musculoskeletal loads with the CUELA measuring system", *IFA Institut Fuer Arbeitsschutz der Deutschen Gesetzlichen Unfallversicherng*, Edition 0013 (Feb. 2013).
Omni-ID, "Omni-ID® Power 60," 2016, 2 pages.
Omni-ID, "Omni-ID® View 3 & View 4," 2016, 2 pages.
Curran et al., "An evaluation of indoor location determination technologies", *Journal of Location Based Services*, vol. 5, No. 2, pp. 61-78 (Jun. 2011).
Köppe, "Lokalisierung sich bewegender Objekte innerhalb and außerhalb von Gebäuden", Dissertation from the University of Berlin, pp. 3-12; 26-51; and 71-111 (Chapter 2.1.1-2.1.3, Chapter 3, Chapter 5 and Chapter 6) (Jul. 18, 2014) (With English Translation).
Meyer et al., "Manufacturing Execution Systems Optimal Design, Planning, and Deployment" (2009) by the McGraw-Hill Companies, Inc.
Swedberg, "Omni-ID's View 10 Tag Aims to Replace Paperwork at Detroit Diesel, Other Factories", *RFID Journal*, 2014.
Want et al, "Active Badges and Personal Interactive Computing Objects", *IEEE Transactions on Consumer Electronics*, pp. 10-20 (Feb. 1, 1992).
Zhong et al., "RFID-enabled real-time manufacturing execution system for mass-customization production", *Robotics and Computer-Integrated Manufacturing*, vol. 29, pp. 283-292 (2013).
JP Japanese Office Action in Japanese Appln. No. 2019-520985, dated Mar. 8, 2022, 8 pages (with English translation).
KR Office Action in Korean Appln. No. 10-2019-7014593, dated Jan. 26, 2022, 8 pages (with English translation).
KR Office Action in Korean Appln. No. 10-2019-7014591, dated Jan. 25, 2022, 8 pages (with English translation).

* cited by examiner

CONTROL OF MANUFACTURING PROCESSES IN METAL PROCESSING INDUSTRY

CROSS REFERENCE TO RELATED APPLICATIONS

This application is a continuation of and claims priority under 35 U.S.C. § 120 from PCT Application No. PCT/EP2017/076869 filed on Oct. 20, 2017, which claims priority from German Application No. 10 2016 120 132.4, filed on Oct. 21, 2016, and German Application No. 10 2017 120 378.8, filed on Sep. 5, 2017. The entire contents of each of these priority applications are incorporated herein by reference.

TECHNICAL FIELD

The present invention relates to methods and systems for monitoring and controlling manufacturing processes, in particular process procedures for the industrial manufacturing of workpieces in steel and/or sheet metal processing.

BACKGROUND

As an example for the metal processing industry, in industrial steel and/or sheet metal processing many parts of different sizes are often fed into various processing steps. For example, workpieces on machine tools, e.g., laser cut material or punched sheet metal parts, are sorted and fed into further processing steps. After the processing operation, cut or punched workpieces are often made available to the respective downstream production step in a group. The various process procedures are usually performed based on a visual comparison with paper-based documents. If, however, many different part shapes are cut, different processing steps are performed, and different areas within a manufacturing hall for the steel and/or sheet metal processing are approached, such monitoring and control operations become time-consuming and prone to errors. For example, a large variety of parts can cause errors in part association and the subsequent processing steps, e.g., during order-specific placing at planned workpiece collecting point units or during transfer to the subsequent processing step. If, for example, parts are placed incorrectly, a subsequent processing step can be adversely affected, e.g., carried out incorrectly.

For example, from the German patent applications DE 10 2016 120 132.4 and DE 10 2016 120 131.6 with filing date 21 Oct. 2016, methods for supporting the sorting process of workpieces produced with a flatbed machine tool, generally methods for supporting the processing of workpieces, are known.

Furthermore, from the German patent application DE 10 2017 107 357.4 with filing date 5 Apr. 2017, a support method for the sorting of, e.g., cut material from a flatbed machine tool is known. The above-mentioned German patent applications are incorporated herein in their entirety.

SUMMARY

The invention relates to a system for workpiece position monitoring in manufacturing halls of the metal processing industry, in particular in steel and/or sheet metal processing. The invention also relates to the association of workpieces with process procedures within manufacturing control.

A physical material flow is usually discreetly synchronized at booking stations with the processing steps to be performed, so that often no detailed or only a delayed evaluation can take place.

One aspect of this disclosure is based on the objective of providing methods and systems that can intelligently support manufacturing processes, especially in the field of steel and/or sheet metal processing—metal processing in general.

The present disclosure provides a method to control manufacturing processes, by an interior localization system, a manufacturing control system, and a method for industrially manufacturing an end product. Further embodiments are indicated in the dependent claims.

In an aspect, a method for the manufacturing control of process procedures, supported by an interior localization system, in the industrial processing of workpieces, in particular in steel and/or sheet metal processing, in a manufacturing hall for manufacturing an end product includes the following steps of: providing a plurality of transceiver units permanently installed in the manufacturing hall, at least one mobile unit, and an analysis unit, the transceiver units and the mobile unit being configured to transmit and receive electromagnetic signals, and the analysis unit being configured to determine the positions of the mobile unit in the manufacturing hall from runtimes of the electromagnetic signals between the transceiver units and the mobile unit; associating the mobile unit with at least one workpiece; determining the position of the at least one associated workpiece by localizing the associated mobile unit with the interior localization system; and integrating the determined position into the manufacturing control system of the industrial manufacturing plant to manufacture the end product.

In a further aspect, an interior localization system for supporting the manufacturing control of process procedures in the industrial production of workpieces, in particular in steel and/or sheet metal processing, in a manufacturing hall includes a plurality of transceiver units permanently installed in the manufacturing hall, at least one mobile unit, and an analysis unit. The transceiver units and the at least one mobile unit are configured for transmitting and receiving electromagnetic signals. The analysis unit is configured for determining runtimes of the electromagnetic signals between the transceiver units and the at least one mobile unit and for determining the position of the at least one mobile unit in the manufacturing hall from the runtimes of the electromagnetic signals.

In a further aspect, manufacturing control system for controlling manufacturing processes in a manufacturing hall, in particular in a steel and/or sheet metal processing industrial manufacturing plant, includes such an interior localization system. The interior localization system is configured to exchange and provide data on the position of at least one mobile unit in the manufacturing hall as part of the manufacturing control system, and the manufacturing control system is configured to associate the obtained position of the at least one mobile unit with at least one workpiece and to include it in the manufacturing control.

A further aspect relates to the use of such an interior localization system for manufacturing control, wherein the positions of the mobile units are determined from the runtimes of the electromagnetic signals, in particular with an accuracy of less than 30 cm. The interior localization system is used for association of one of the mobile units with at least one workpiece in a metal processing, in particular steel- and/or sheet-metal processing, industrial manufacturing plant, determination of the position of the at least one workpiece by localizing the associated mobile unit with the interior localization system, and integration of the interior localization system into a manufacturing control system of the industrial manufacturing plant.

In a further aspect, a method for industrially manufacturing an end product using a manufacturing control system (herein also referred to as MES (manufacturing execution system)) includes the following steps:

receiving a manufacturing order for manufacturing the end product from a workpiece with an MES of the manufacturing control system, the MES being implemented in a data processing device;

selecting individual processing steps with the MES;

determining a sequence of the processing steps with the MES, the processing steps including one or more of the following procedures: cutting, in particular laser cutting, punching, bending, drilling, thread cutting, grinding, assembling, welding, riveting, screwing, pressing, treating the edges and surfaces;

data-technical associating of the processing steps with a machine or a workstation unit;

data-technical associating of the manufacturing order with a mobile unit data set in the MES;

manufacturing a workpiece for the end product, in particular being processed to form part of the end product after a first of the processing steps at the machine or workstation unit associated with the processing step;

spatially associating of the mobile unit associated with the manufacturing order with the manufactured workpiece;

storing a status change of the manufacturing order in the MES;

transporting the manufactured workpiece together with the mobile unit in accordance with the manufacturing order to the next machine or workstation unit in the predetermined sequence;

performing the processing step at this machine or workstation unit;

storing a status change of the manufacturing order in the MES; and performing the processing steps of the manufacturing order with the MES, wherein the position of the mobile unit is determinable with the localization system at any time by the MES on the basis of electro-magnetic signals, and the MES has data on the current status and the current position of the workpiece at any time.

In some embodiments, the mobile unit includes an acceleration and/or a position sensor, and in particular a MEMS-based sensor and/or barometer sensor. Accordingly, the method can further include integrating of a signal from the acceleration and/or the position sensor, and in particular the MEMS-based sensor and/or the barometer sensor, into the control for manufacturing the end product, wherein a movement signal or an orientation signal is optionally used for associating the mobile unit with the at least one workpiece. Signals can thereby be generated by shaking the mobile unit and/or by specific positions of the mobile unit and/or by performing specified gestures with the mobile unit. The method may also include an evaluation of image information of the at least one workpiece and/or the mobile unit, wherein the image information includes, e.g., labels such as barcodes, images, etc.

In some embodiments, the method includes associating of the mobile unit with an operator, a transport device, a machine tool, or a tool; determining of the position of the mobile unit associated with an operator, a transport device, a machine tool, or a tool with the interior localization system; and integrating the determined position into the control system for manufacturing an end product of the industrial manufacturing plant and/or into a motion analysis of the operator, the transport device, the machine tool, or the tool.

In some embodiments, the method includes defining zones and/or spatial gates in the manufacturing hall, in particular in a site plan of the manufacturing hall; and comparing the determined position with respect to the zones and/or the spatial gates, and controlling the manufacturing based on the comparison. Comparing the determined position may result in the mobile unit being located in a zone or having left the same, or the mobile unit having passed a spatial gate. The zones and/or the spatial gates may be defined in two or three dimensions.

For example, the integration of the determined position in the control system for the manufacture of an end product can include one or more of the following steps:

giving signals to support localization;

displaying of information about the manufacturing status, in particular on a mobile output device such as a tablet, a smartphone, or a monitoring monitor;

setting the operating parameters of a machine tool;

updating a protocol that logs the manufacturing, in particular processing steps;

associating the mobile unit with an order for the manufacture of one or more end products in several different work steps.

Furthermore, the integration of the determined position in the control system for the manufacture of an end product can include controlling and/or monitoring:

a processing of the at least one workpiece in a plurality of different working steps, which are performed at different locations, but in particular within the manufacturing hall;

a transport of the at least one workpiece between different working steps, which are performed at different locations, but in particular within the manufacturing hall;

a processing of the at least one workpiece at workstations, which are linked to or integrated into the manufacturing control system; and/or a processing of the at least one workpiece at workstations, which are not linked to or integrated into the manufacturing control system.

Several workpieces, in particular those which have the same shape in the final state and have gone through the same processing steps, and in particular those which also belong to a common order, are referred to as workpiece collection units or workpiece group. These are usually placed at a workpiece collecting point unit. It is advantageous to assign a mobile unit to each workpiece collection unit, in particular both physically (by placing the mobile unit near a workpiece collecting point unit, e.g., on the workpiece collecting point unit) and digitally (by digitally associating a mobile unit data set with a processing plan in the manufacturing control system). A list of all orders (including processing plans) can be stored in the manufacturing control system. Each of the orders can be assigned to a workpiece collection unit. If, in addition, the orders are assigned to one mobile unit each, then each order can be localized in the manufacturing hall at any time. This can also be combined with feedback information from workstations and/or machines in the manufacturing control system.

The interior localizing and the interior localization system are characterized by the fact that determination of the position of the mobile units can be done solely by the analysis unit, i.e., without manual interaction. Previous systems for localizing workpieces or orders in manufacturing plants have the disadvantage that lost workpieces or orders had to be searched for manually. It has been recognized that these manual search operations, especially in manufacturing plants with a large number of small and constantly changing orders, such as contract manufacturing plants, make up an enormously high proportion of non-productive time. With the inventive localizing and the described system, the positions of the workpieces and thus the orders can be retrieved, filtered, or specifically localized, e.g., on a screen. The need for time-consuming manual search procedures of workpieces, but also of tools or persons, can thus be drastically reduced, in particular in (steel and/or sheet metal processing) industrial manufacturing.

Further advantages of aspects disclosed herein concern the simplified integration of an interior localizing into manufacturing processes.

In some embodiments, the processing of the workpiece or workpieces is controlled or monitored at workstations that are linked to or integrated into the manufacturing control. Such machine workstations comprise machines that receive and execute manufacturing instructions via data link, in particular digitally. Thereby no or only a minimal intervention by the operator is carried out. Such machines are usually referred to as automated or fully automated machines. Such machines can also report the status of manufacturing to a manufacturing control.

In some embodiments, the processing of the workpiece or workpieces is controlled and/or checked at workplaces, which are only to a very small extent or not at all linked or not integrated into the manufacturing control. These can be workplaces where the work steps are carried out manually by human hands or those which do have machines, but which are only connected to a very small degree or not at all, or which can also only be interconnected in a very complex manner, e.g., so-called manual workplaces, as described in DE 10 2016 220 015.1, with filing date 13 Oct. 2016. This German patent application is also incorporated herein in its entirety.

Workstations that are only networked to a very small degree can be manual workstations with basic machines, such as workstations for drilling, sawing, milling, and bending. The only networking can be a monitoring system, as described in DE 10 2016 220 015.1. A further networking option is the monitoring of the power consumption of such machines and the networking of information from the power consumption. For example, if a machine has not consumed any power at all, it can be concluded that the machine has not yet processed the order.

In particular, the combination of manufacturing processes with workstations, which are networked with or integrated into the manufacturing control system, and those workstations, which are not networked or only to a very minor degree, still represent an important obstacle to effective and efficient manufacturing control today, because orders are still printed on paper when they come from an automated workstation to a non-automated workstation. This slows down the manufacturing process. This also makes flexibility more difficult when, for example, an order, which is to be processed particularly quickly, should be processed with several processing steps at several workstations within a short time. A manufacturing facility that can ensure performing these processing steps smoothly has advantages over its competitors that cannot. By localizing the workpieces and linking the localization with the manufacturing control, the concepts disclosed herein can enable flexible and fast manufacturing of end products.

Based on the concepts disclosed herein, intelligent assistance systems in manufacturing halls can use a 2D or 3D position determination of workpieces (generally material) and optionally persons (e.g., operators), transport media, machines, tools, and much more to support manufacturing processes. Thereby, it becomes possible to use 2D or 3D positions as information, which is available in addition to other sensor information and has been determined according to the concepts disclosed herein, in the context of a holistic manufacturing control and digitization of factories.

The concepts disclosed herein are based on the use of a 2D/3D interior (indoor) localization system as a starting point for location dependent information processing. The localization system can optionally be equipped with further sensors, e.g., acceleration and/or orientation sensors, and thus serve as a starting point for location-dependent information processing. In particular, this enables location dependent (and, if necessary, orientation dependent) interaction within the 2D/3D interior localization system for the manufacturing control as well as optimization of manufacturing operations. For example, virtual bars (gates) and zones can be used to automatically monitor and control a manufacturing process and subsequent production steps. In particular, this can be done in real time.

It was recognized that the use of such localization systems is also possible in the special environment of a steel and/or sheet metal processing industrial manufacturing, taking into account the expected process operations in a manufacturing hall. Accordingly, such localization systems can be integrated into a manufacturing control system (also referred to herein as MES (Manufacturing Execution System)). Taking into account the process operations to be expected in a manufacturing hall makes the use of such localization systems possible, e.g., despite the presence of steel and sheet metal, although metallic workpieces can reflect and shield the electromagnetic signals used. It can also be used if the metallic workpieces are furthermore moved locally and the position and orientation of the reflecting surfaces are constantly changing.

With reference to the above-mentioned booking of physical material flow and processing steps, the use of 2D/3D interior localization systems creates complexity in the low-cost, dynamic association of acquired location information with physical components. The concepts disclosed herein address this complexity and make it possible, for example, to associate production orders (having assigned identifiers) without time-consuming interaction with a mobile unit with which associated location information is acquired.

Interior localization systems allow the detailed mapping of material flows during manufacturing within a manufacturing hall into digital process processing. The localization systems simplify the localization of the objects/persons participating at the manufacturing in the production environment. If tools, equipment, or load carriers are initially equipped with a mobile unit of the localization system, they must be associated manually or automatically with respective digital information in the digital control system. This also applies to objects temporarily involved in manufacturing, such as production orders or service personnel. Temporarily required dynamic associations can arise again and again and are only needed for a few hours, days, or weeks in the manufacturing hall. In order to enable and ensure the dynamic association of the mobile units with new production orders with minimum effort and reliability, the process assistance proposed herein can be used.

This applies in particular to the use of optical sensors for the simple association of, for example, production orders with mobile units of the localization system. This enables a close interlinking of the association process and the manufacturing process, which ensures process safety, in particular, in a still predominantly manual environment of manufacturing.

The embodiments disclosed herein of the integration of such an interior location technology into the processes of sheet metal manufacturing may include inter alia the following process steps, uses, and advantages:

- illustration of the changing association of orders;
- illustration of assistance for a person, e.g., operator, with the help of the localization system and other sensors, in particular for the localizing of workpieces and tools;
- ensuring a process-reliable and low-cost manufacturing through automated processes with low degrees of freedom for the operator;
- intuitive manufacturing procedure without time-consuming gathering of information for the operator.

The determination of an interior position can be performed with the methods disclosed herein to an accuracy of less than 30 cm, in particular, less than 10 cm, in a manufacturing hall not accessible by GPS satellite signals with a site plan in the range of, for example, 1 ha (hectare). This accuracy may not be possible with other technologies (Bluetooth, WiFi, WLAN, infrared, mobile radio, RFID). When locating workpieces, orders, persons (e.g., operators) and/or tools, many requirements have to be considered. Obviously, industrial manufacturing is more and more directed towards the manufacturing of small series with many individual work steps (manufacturing processes such as cutting, bending, grinding, surface treatment) at different workstations such as machine workstations and manual workstations. This often means that several hundred different orders have to be completed in one day, all of which require different work steps.

As soon as only one disruption occurs, the manufacturing control can quickly become very unclear. Time-consuming, half or not yet processed orders in the manufacturing hall are searched for by individual persons and the status of the orders is determined. The information is then transferred to the manufacturing control. This can lead to a considerable loss of time during the intended manufacturing.

Due to the ever faster processing steps in productive processing and the increase in the number of different orders with ever smaller numbers of identical parts, such downtimes can occur more and more frequently. The resulting losses of time reduce the productive time. If orders, workpieces, persons, e.g., operators, and tools are to be found quickly, the localizing disclosed herein is helpful in reducing downtimes. In particular, the localizing meets the very high accuracy and speed requirements for industrial production.

The aim in industrial manufacturing is a real-time localization. It should be locally precise enough that mobile units can be reliably found and/or associated with the processing steps. In addition a localization that is exact only to 1 m is not sufficient. Also a localization, which would have to be recalibrated with each change of the radiation behavior of electro-magnetic waves, caused, e.g., by movement of metallic workpieces in the manufacturing hall, is disadvantageous and often not useable. The localization should also be flexible, it should be possible to combine several orders into one order, one order should be dividable into several orders etc. The localization should be easy to operate. It should be failure-proof.

In general, the concepts disclosed herein can enable an increase in process reliability, a reduction in throughput times and, accordingly, a cost reduction in production. In particular, the concepts disclosed herein can result in considerable time savings in the manufacturing process, whereby the manufacturing process extends, for example, from the manufacture of a required number of parts to the correct transfer to a subsequent process (e.g., a subsequent metalworking step). Furthermore, several orders can be implemented quasi simultaneously with process reliability. The concepts disclosed herein also allow easy association of workpieces within the localization system. In this way, more number of open orders can be processed despite the complexity of several orders to be processed simultaneously.

Furthermore, a flexible execution of different process sequences with the accompanying time saving can be achieved if machines such as laser cutting machines and/or punching machines are integrated into the semi-automated manufacturing process. Furthermore, error avoidance and the automatic, correct booking of workpieces, processing steps, etc. can lay the foundation for a data-based real-time control of the metal processing (e.g., steel and sheet metal manufacturing). Accordingly, machine tools that are used for the production of small batch sizes of workpieces can also be integrated into a manufacturing controlled by an MES within the framework of Industry 4.0.

DESCRIPTION OF DRAWINGS

Herein, concepts are disclosed that allow to improve aspects of the prior art. In particular additional features and their usefulness result from the following description of embodiments on the basis of the drawings. The drawings provide.

DETAILED DESCRIPTION

Figure 1:
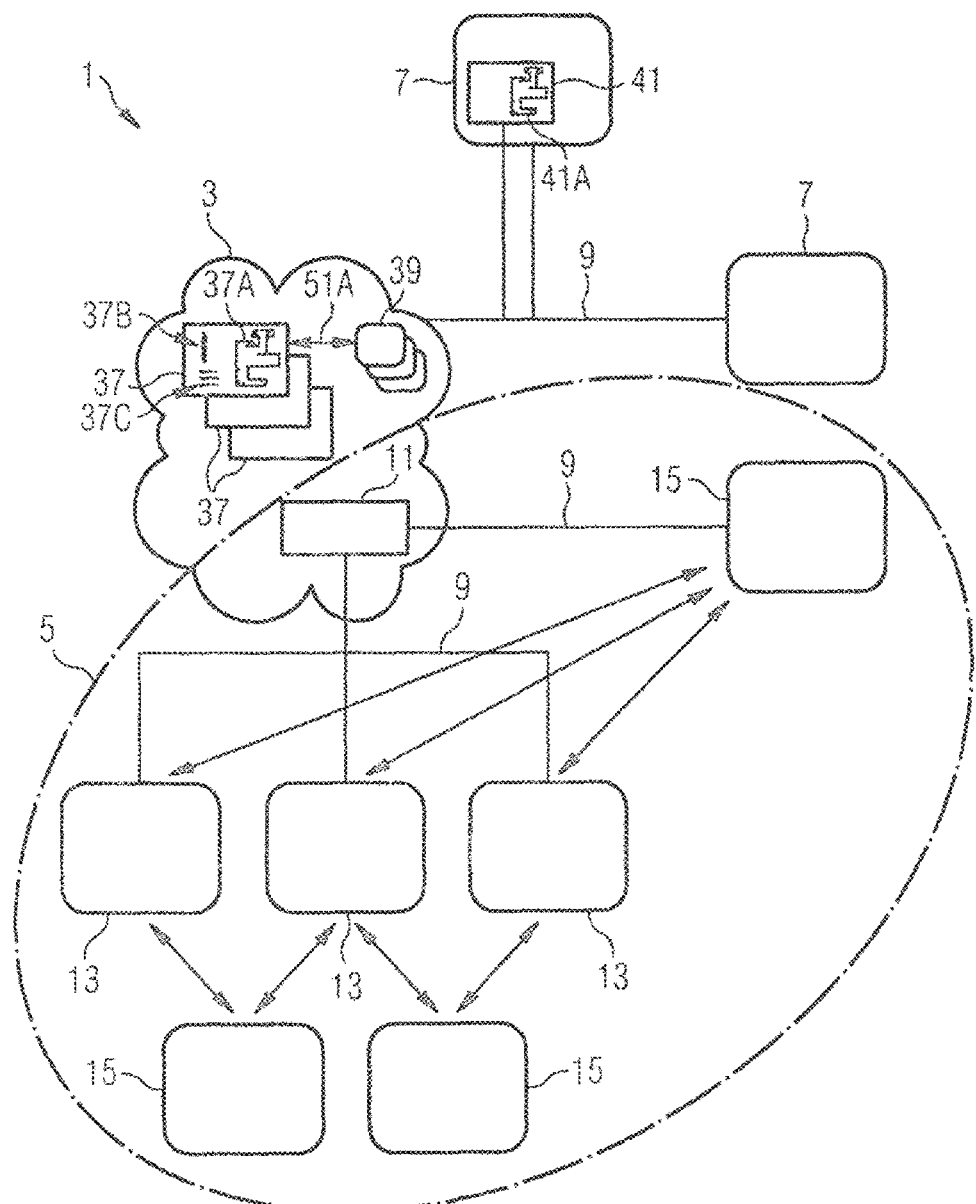
FIG. 1 illustrates an exemplary schematic illustration of a manufacturing control system with an interior localization system.

The aspects described herein are partly based on the realization that with the accuracy and reliability of new localization systems based in particular on the ultra-wideband (UWB) technology, for example, having an accuracy of less than 30 cm, in particular less than 10 cm, the use of interior localization systems in the context of industrial manufacturing becomes possible.

The localization systems disclosed herein, intended for being integrated into industrial manufacturing, are based on mobile units (herein also referred to as "tags") and stationary transceivers (herein also referred to as "anchors"). When integrated into industrial manufacturing, for determining the position of a workpiece, generally an object ("asset"), the workpiece is provided with at least one mobile unit or is functionally or spatially linked to the mobile unit (herein also referred to as physical or spatial association), so that for example, the mobile unit moves with the workpiece through a manufacturing hall. The mobile units are generally electronic components capable of communicating with the transceiver devices, in particular by means of UWB communication technology. Each mobile unit can have its own time determining unit ("clock") to determine runtimes.

A spatial assignment can be carried out by positioning a mobile unit close to an associated workpiece or on the workpiece itself, or by placing the workpiece on a workpiece collecting point unit at which a mobile unit is provided, for example a transport carriage, a collection container, or a pallet. The mobile unit can be fixedly attached at those (or at a person) or attachable on the workpiece/workpiece collecting point unit or placed on it. For example, the mobile unit can be equipped with a holding mechanism for attachment, such as a magnet or a clamping, screwing, clipping, bayonet, or suction device, with which it can be connected to the workpiece or to the workpiece collecting point unit in such a way that it cannot become detached from it in an uncontrolled manner.

In addition to the spatial association to be made between a workpiece and the mobile unit, for example, the mobile unit (and thus the spatially associated workpiece) can also be associated with the associated production order for the workpiece (also referred to herein as digital association of the manufacturing process or briefly processing plan association).

Fully or partially automated processing plan associations connect, for example, a production order with a specific mobile unit of the localization system. For example, they can be carried out by a combined use of an assistance system in the surrounding of the operator and the localization system.

An example of an assistance system is an optical assistance system in which optical sensors detect workpieces or tools gripped by the operator and, in the context of the available production data from the production orders, are identified (preferentially) unambiguously for the processing plan association. An exemplary assistance system is disclosed in the DE 10 2016 120 131.6 mentioned above. Such assistance systems can also be used for the spatial association if, for example, image data concern the workpiece and the mobile units. Furthermore, one or more sensors provided on the mobile unit can be used for the association of the processing plan, but also for the spatial association, as will be explained in the following in connection with the embodiments of the mobile unit.

The spatial association can then support the further tracking of the detected and associated workpiece via the locatable mobile unit during the subsequent manufacturing process. In the following, and in connection with the figures described below, various physical (spatial) and digital (process) associations are explained in an exemplary manner. These can be used individually or in combination. The close interlocking of the process procedure ensures process reliability in the manual environment.

With the digital association, the mobile units can be linked with production orders. The production orders relate to machining processes at various manufacturing stations, for example, at a laser cutting machine or at a punching machine as well as, for example, at a picking station. A mobile unit can now be used to track a production order. The digital association can take place, for example, by positioning a mobile unit in a geometrically defined zone. If the mobile unit is present in the zone, it is linked to one of the unassociated production orders. Information on this order can be loaded onto the mobile unit at the beginning or, as required, the information can always be loaded onto the mobile unit in an up-to-date matter.

The digitally associated mobile units can, for example, be distributed by the operator to workpiece collecting points such as carriages or pallets, generally load carriers, on which during manufacture the workpieces may be placed potentially using camera-assistance (physical allocation). Likewise, tools can be digitally associated with a mobile unit. Within the framework of a machine-based digital and/or physical association, the mobile units can also be positioned on the load carriers by machines used in the production process if the manufacturing stations are sufficiently automated.

With the physical association, the operator or possibly an appropriately controllable machine can automatically place the workpieces to be associated on the load carrier next to the mobile unit that may already be digitally associated. For example, the physical association is completed manually with a confirmation directly at the mobile unit or via the MES.

Furthermore, the physical association can be supported by an assistance system that tracks the manual handling procedure. If an operator picks up a workpiece or tool, this pick-up can be detected by the assistance system with sensors. The association by the assistance system with an already digitally associated mobile unit can, for example, be done in two ways. In the first case, the operator can visually associate the real workpiece/tool with a schematic sketch that is displayed on a display unit of the mobile unit. In the second case, by registering the successful grip of a workpiece/tool, the correspondingly associated mobile unit can emit an optical or acoustic signal, for example.

As an alternative to the previously performed digital association, the assistance system can arrange for a mobile unit in the vicinity of which a workpiece/tool is placed to be digitally associated according to the type of workpiece/tool recognized by the assistance system.

As an alternative or in addition to the camera-based assistance system, adynamic association can be carried out by scanning, for example, order papers and/or a code (e. g., barcode, QR code, etc.) of the mobile unit. Furthermore, a common or two separate photos can be evaluated with the code of the order papers and the code of the mobile unit. In some associating methods, a photo of the order papers can be taken with a camera at the mobile unit (or a separate camera of the operator), possibly in addition to an optical assistance system.

As an alternative or in addition to processing the information on order papers, a nominal geometry of the workpiece can also be used. After comparing the geometry of the workpiece, which has been acquired, for example, with the camera-based assistance system or the camera on the mobile unit, with the nominal geometry, information can then be loaded from the central production data system and displayed to the operator. If the image processing does not allow a unique identification, one can list to the operator a subset of the active production orders, which are suitable for the acquired geometry. The operator then makes the final selection and establishes the digital association.

This improves process reliability. In particular, similar-looking workpieces/tools can be uniquely associated without the workpieces being confused, wrongly associated, and incorrectly processed, for example, by the operator.

FIG. 1 schematically shows a manufacturing control system 1, which includes an MES (Manufacturing Execution System) 3 and an interior localization system 5 (in short: localization system).

The MES 3 is connected to one or more machine tools 7 positioned in a manufacturing hall via wireless or wired communication links 9. In general, the MES 3 is used to control process procedures/manufacturing steps in the industrial manufacture of workpieces with the machine tools 7. It thus serves in particular to control the machine tools 7. For this purpose, the MES 3 receives information about the process procedures/manufacturing steps as well as status information of the machine tools 7. The MES 3 represents a data processing system or generally a data processing procedure which can be implemented in a data processing device. The latter may be a single electronic data processing device (server) or an interconnection of several data processing devices (server network/cloud). The data processing device or the network can be provided locally at the manufacturing site or can be set up externally in a decentralized manner.

A platform on which the data processing devices can be available—i.e., on which the MES 3 can be implemented—can be a so-called cloud. For example, the cloud includes an external server with computing and storage capacity that can be used simultaneously by several product manufacturers. Access authentications, passwords, etc. can be used to ensure that no manufacturer can access the data of another manufacturer or of the provider of the manufacturing plant. It can be ensured that no external third party can access the stored data. Protection against unwanted access can be ensured by ensuring that the data stored in the cloud is also processed therein and that the manufacturer or provider of the manufacturing plant who wants to use the data only processes the data in the cloud. Such cloud uses can lead to a significant simplification of system configurations and accompanying cost savings.

The data processing device may have a graphical user interface (GUI) with various application programs (APPs). By providing different APPs that can run a particular application program, the manufacturing software that a company needs can be built in a segmented way so that it only needs to be retrieved on demand when it needs to be used, such as when using a specific APP. This makes it possible that a usage can be remunerated on demand to that provider who provides the manufacturing software.

The localization system 5 may have several transceiver units 13 and at least one mobile unit 15. The localization system 5 can also interact with the MES 3. For example, an analysis unit 11 of the localization system 5 may be adapted as a part of the MES 3.

The transceiver units 13 can be configured to send UWB radio signals to the mobile units 15 and receive UWB radio signals from the same.

The distance between a locally movable mobile unit 15 and a, for example, fixedly installed transceiver unit 13 can be determined by the time the signal needs to travel the distance between the two units. If the distances of several transmitting/receiving units 13 are determined, each of whose locations is known, the spatial location of the mobile unit 15 in relation to the transmitting/receiving units 13 can be determined, e.g., by triangulation.

For the determination of the runtime, the transceiver unit 13 and the mobile unit(s) 15 may be equipped with high-precision clocks, which can determine the time to an accuracy of a few or even only fractions of ns (nanosecond). Even if the clocks in the transceiver unit 13 and in the mobile unit 15 are highly accurate, the clocks are not yet necessarily synchronized. Different methods of synchronizing clocks or eliminating errors from the asynchronous clock process can be used. For example, one of the transceiver units 13, e.g., as master position determination unit, can send a signal at a first time T1 and a second signal at a second time T2. The time difference T2−T1 can be known to the mobile unit 15 or transmitted together with the signals, so that it can synchronize itself to the time of the transceiver units 13. Alternatively, the mobile unit 15 can send two signals at a known time interval Ta. In this case, by means of its own time measurement with its own clock, the transceiver unit 13 can determine the synchronization deviation from the reception of the first signal to the reception of the second signal and exclude it from the distance measurement. The time interval between the first signal and the second signal should be small, so that the mobile unit would not move significantly during this time. The time interval may be selected by the mobile unit so that it is a predetermined multiple or fraction of the time that it takes for the mobile unit to receive a signal to which it is intended to respond until the output of the first signal.

The transceiver units 13 can also be connected to the analysis unit 11 via wireless or wired communication links.

The mobile units 15, for example, can only communicate via the transceiver units 13. Alternatively or additionally, they can communicate independently with the analysis unit 11 and/or the MES 3 via further communication connections (e. g., a WLAN connection).

In general, the data communication of the transceiver units 13 and the mobile units 15 can be set up bidirectional with the manufacturing control system 1, in particular with the MES 3.

In some embodiments, WLAN transmitter stations can be integrated into the transceiver units 13 of the localization system 5 for a data access into the manufacturing control system 1, so that via the transceiver units 13 digital data in the manufacturing hall can be accessed mobile, e.g., via smartphones or tablets. The integration of the WLAN transmitter stations into the transceiver units 13 can simplify the installation and operation of a data communication system in the manufacturing hall.

The analysis unit 11 may, for example, serve as a central master position determination unit (herein also referred to as a "server"). It defines, for example, a communication frame for UWB communication. The communication frame includes, among other things, the transmission time of the frame/the UWB radio signals. In some versions, one of the transceiver units 13 may be configured as the master position determination unit.

In an exemplary implementation of the interior localization, a master position determination unit transmits a communication frame to the transceiver units 13 for a position detection of one of the mobile units 15. This communication frame is used for the signal exchange needed for the localization between the mobile units 15 and the transceiver units. The position of the stationary transceiver units 13 with respect to the master position determination unit is known to the transceiver units 13, e.g., by a query of a central database, so that the transceiver units 13 as well as the analysis unit 11 know the time delay between transmission and reception of the UWB radio signal over the signal runtime.

After a predetermined time interval, e.g., 100 ms (microsecond), the master position determination unit transmits a second communication frame that is received by the transceiver units 13 and the mobile units 15. By recording the time from the start of reception of the first frame to the start of reception of the second frame, the transceiver units 13 and the mobile units 15 know what the master position determination unit measures as, for example, exactly under 100 ms. The mobile units 15 and the transceiver units 13 can thus synchronize the frequency of their time determination units with the master position determination unit.

After different, previously configured time intervals (measured from the reception of the second frame), the mobile units 15 send a response frame. For example, a "Tag 1" transmits after 10 ms, a "Tag 2" after 20 ms, a "Tag 3" after 30 ms, etc. This radio transmission is received by the transceiver units 13 and the exact reception time with respect to the transmission start of the second frame of the master position determination unit is transmitted to the analysis unit 11. The analysis unit 11 then determines the position of the mobile units 15 using trilateration procedures, for example, and passes this on to the MES 3.

A group of transceiver units 13 can be assigned to a master position determination unit and the reception times can be transmitted to it. To capture positions in large manufacturing halls or across multiple buildings or rooms, multiple groups of transceiver units 13 can be provided, each assigned to its own master position determination unit. These master position determination units can in turn communicate with each other. Depending on the position of the mobile units 15, the reception times can be transmitted to different master position determination units (servers) and the trilateration can be carried out with these different master position determination units.

Using the analysis of runtimes and trilateration described above as an example, the interior localization system 5 can detect the position of one or more mobile units 15 via the transceiver units 13 using UWB technology. The UWB technology uses frequency ranges from, e. g., 3 GHz to 5 GHz, whereby the UWB technology uses a relatively large frequency range for the formation of sharply limited signal sequences (communication frames). In order to locate an object that emits radio waves as accurately as possible, a signal with very steep edges is required. This means that the signal represents a rectangular signal course over time rather than a sinusoidal course. This requires a signal in which several sinusoidal signals with different frequencies are superimposed. This is because a signal can be formed from several sinusoidal signals with different frequencies, which has a steep edge and can be approximated over time to an essentially rectangular shape. This means that several frequencies from a broadband frequency spectrum must be available in order to form a signal. Accordingly, UWB technology, which has a broadband frequency spectrum, is particularly suitable for precise localization. The technology and the usable frequency bands of the UWB technology are for example described in the standard "IEEE 802.15-2015".

Figure 2:
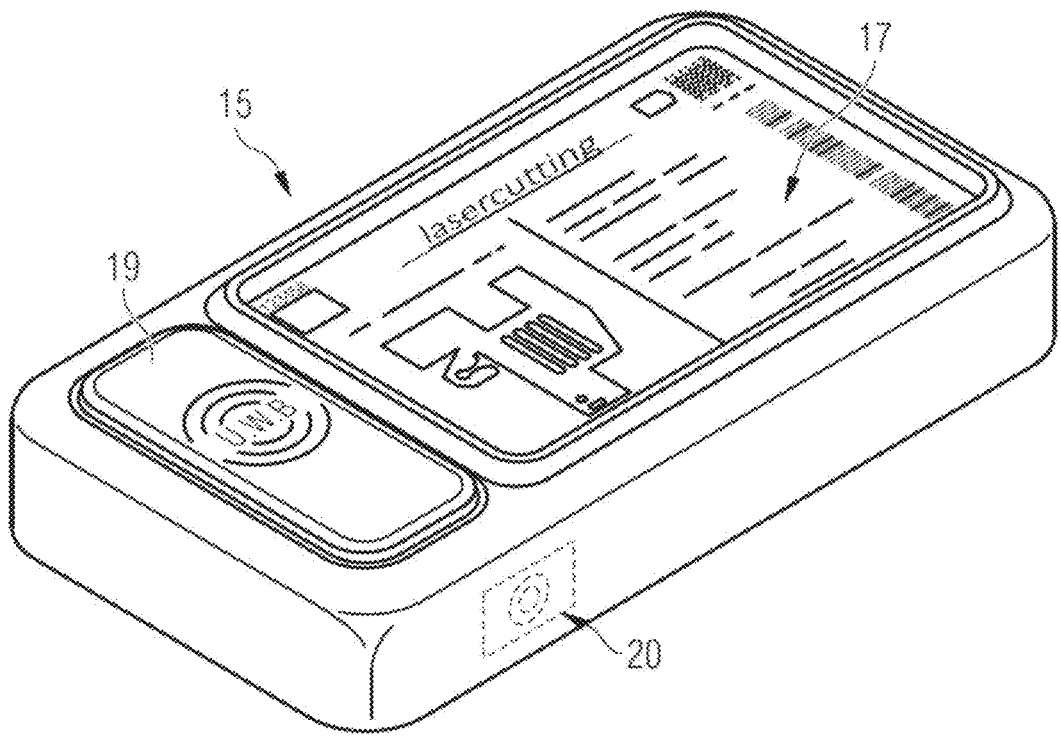
FIG. 2 illustrates an illustration of an exemplary embodiment of a ultra-wideband (UWB)-based mobile unit.

FIG. 2 shows an example of a mobile unit 15. In order for an operator to interact with the mobile unit 15, it can have an electronically controllable display 17, for example, an e-ink display (also referred to as an electronic paper display), and/or one or more signal output devices 18 (LEDs) for outputting information.

The display 17 can, for example, display information about the order, legible for man and/or machine, coded and/or in writing and/or as a figure. The display 17 can also be used as a signal output device for feedback to the user who in one of the described ways moves (e.g., shakes) or operates (e.g., presses a key 19) the mobile unit 15.

Another example of a signal output device is a device for outputting sound, in particular in the audible range, in particular for outputting speech information.

In general, the mobile unit 15 can have a modulatable signal source for generating modulated light, sound, or vibration signals as a signal output device. It can then— similar to the communication device described in the German utility model DE 20 2016 106 352 U1—be used as a data-transmitting communication device for wireless transmission of data. With the help of such a communication device, which does in particular not have a camera, an appropriately supplemented mobile unit can, for example, transmit access data in interaction with an electronic signal processing unit. The communication device may comprise at least one sensor for receiving light, sound, or vibration signals and the signal processing unit may be programmed to recover from received modulated signals the data contained therein.

Furthermore, at least one signal input device can be integrated into the mobile unit 15 (for example, a key 19 is shown in FIG. 2) for inputting parameters.

As a signal input device, the mobile unit 15 can also have a sensor for receiving light, sound, or vibration signals, in particular a brightness sensor. It can then, as described, for example, in the above mentioned DE 20 2016 106 352 U1, be used as a data receiving communication device for the wireless transmission of data, in particular access data, from a machine tool. For this purpose, the machine tool has at least one modulatable signal source for generating light, sound, or vibration signals that have been modulated according to the data to be transmitted. In some embodiments, for example, such devices of the machine tool can be used that are already present in the machine tool for processing the workpieces and that offer the possibility of generating sound, vibrations, or modulated light fluctuations with which data can be transmitted to the mobile unit 15.

In some embodiments, the mobile unit 15 may have a transmitter and/or receiver for data transmission by electromagnetic induction and may be adapted to perform data processing according to a predefined protocol (e.g., via RFID, NFC: near field communication). This can be achieved with particularly cost-effective hardware components, which can also be configured to save energy. Generally the near field communication via NFC or RFID is a robust, fast, and wireless communication in the near field.

The automated or assisted association can be made intuitive and process-reliable by further sensors provided in the mobile unit. However, the exemplary sensors described below can also be used profitably in another context of manufacturing.

For example, gyroscopes, acceleration sensors, position sensors, vibration sensors, and/or magnetic sensors for the earth's magnetic field can be provided. Other MEMS (micro-electro-mechanical system)-based sensors can also be integrated additionally or alternatively.

Such sensors can cause a more robust and accurate position determination by sensor fusion with the position data of the localization system. In addition, a sensor (or multiple sensors together) can form the basis for an interaction with a person, e.g., an operator, who makes gestures ("writing in the air") or targeted vibrations. This can be done contextually depending on the location. A certain gesture in a first zone can then trigger a different action in another zone.

The evaluation of the sensors of the mobile unit is particularly target-oriented and meaningful when put into the context of the production environment. Partial groups are formed in the storage area, several sensors are combined during welding, assembly, and joining. They can also be used for quality control and marking of rejects.

For example, vibration sensors can be used to identify interaction with the operator and to identify vibration profiles (documentation of the production environment for specific components) to optimize the production environment. They can also be used to detect earthquakes.

The mobile unit 15 may also have a camera 20 adapted to capture images of workpieces and/or codes (e. g., barcodes or QR codes) on the workpieces or on other documents, tools, or products. In this way, workpieces and/or orders can be associated with the mobile unit 15. In addition, the mobile unit can have a functionality for determining, processing, and transmitting of the camera data.

In some embodiments, the mobile unit 15 may have a sensor (weighing cell) to determine the weight of a workpiece and/or a workpiece collecting point and/or the filling level of a workpiece collecting point. In addition, it may have a functionality for the processing and transmission of the correspondingly determined data. Furthermore, the level of a workpiece collecting point can be monitored, e.g., by means of magnetic induction, electrical capacitance, ultrasound or camera-based, or a combination of these technologies.

The mobile unit 15 may also have a sensor for determining a magnetic field strength. In addition, it may have a functionality for processing and transmitting data. Such a magnetic field sensor can be used to read out a magnetic coding which is, for example, embedded in a workpiece. Generally, such sensors can serve as a basis for an unambiguous identification of sheet metal components by the specific structure of metals. An example of such a sensor is a Hall sensor. In general, such sensors can be configured for eddy current measurements. Corresponding methods for coding and reading out such a coding are disclosed, for example, in DE 102 48 142 B3 or DE 43 06 209 A1.

In some embodiments, the mobile unit 15 may have a sensor and/or a transmitter for receiving and/or transmitting data via an infrared (IR) interface. In addition, it may have a functionality for processing and transmitting such IR data. IR interfaces (IR diode, IR LED, bluetooth low energy) as communication interfaces are inexpensive and can be very power saving.

The mobile unit 15 can also be equipped with a temperature sensor together with a functionality for determining, processing, and transmitting temperature data. As the location of the mobile unit 15 is known to the manufacturing control, one can use the manufacturing control with the temperature data to regulate the room temperature in the manufacturing hall. The manufacturing control can detect the temperature in particular in every area of the manufacturing hall in which there is a mobile unit with a temperature sensor and, for example, display it graphically or evaluate it for error conditions. For example, unusual cold development with open doors can be detected or an alarm can be given in the event of unusual heat development. Similarly, the mobile units can form a decentralized network of humidity sensors to control the humidity in the manufacturing hall and/or of brightness sensors to control the illumination of the manufacturing hall. In addition to using the mobile unit as a sensor for building control, such temperature sensors and humidity sensors can be used to document the manufacturing conditions for a specific workpiece or generally for the operation of the manufacturing plant.

In some embodiments, the mobile unit 15 can additionally have a GPS sensor with a functionality for determining, processing, and/or transmitting GPS data.

The mobile unit 15 may also include a gas sensor, in particular a smoke detector, together with a functionality for the acquisition, processing, and/or transmission of gas analysis data. As smoke detectors, the mobile units form a decentralized early warning system in the event of a fire or in the event of a defect in a machine.

In some embodiments, the mobile unit 15 may have a sensor for the recognition of biological data, in particular person-specific data such as fingerprints or facial recognition data. The mobile unit 15 or the production control can thus recognize individual persons. This makes it possible, for example, to set the display of the mobile unit 15 to a language assigned to the person (e. g., the person's native language). Furthermore, certain information can only be output to certain persons, for example, depending on an activity profile assigned to the person.

The mobile unit 15 can also have a sensor for detecting the vital functions of a person, e.g., an operator, being in the vicinity. For example, data concerning pulse/heartbeat, muscle contraction/stretching, blood pressure can be recorded in this way. The data allow the physical condition of the person to be monitored and can provide information about his or her activity. The mobile unit 15 has the corresponding functionality for the determination, processing and/or transmission of data recognized in this manner. Accordingly, the mobile unit carried by a person can monitor his/her condition.

In some embodiments, the mobile unit 15 may have a sensor for detecting audio signals together with the functionality to detect, process, and/or transmit data thus detected. The mobile unit can be controlled by voice input, record audio data, store, evaluate it, and forward it to other mobile units.

The previously described sensors and functions on the mobile unit 15 can, for example, be activated or deactivated by the manufacturing control. The activation of individual functionalities can be timed as an option by the operator or distributor of the manufacturing control system in the form of a special licensing procedure. If, for example, an operator of a production plant wishes to have functions only for a certain period of time, e.g., temperature monitoring only when his manufacturing hall is not in operation, he can, in accordance with the licensing procedure, have this functionality enabled for a period of time specified by him. This may, for example, be more cost-effective for him by the licensing procedure than if he uses the functionality continuously. For the operator or distributor of the manufacturing control system, this may have the added value of getting to know better the functionalities actually used by his customers.

Usually the electronics of the mobile unit 15 are operated with a battery or a rechargeable battery. A rechargeable battery can be charged by means of external contacts or contact-free, e.g., inductive charging. Both can be done in such a way that the mobile unit 15 has a tightly enclosing housing to protect it from moisture and environmental influences. The mobile unit 15 may also have a device for charging the batteries that derives energy from environmental influences, e.g., the so called "energy harvesting" from temperature differences between the top and bottom, from rapid movements such as vibrations or shocks or from existing electromagnetic waves (e.g., solar).

In order to operate the battery or rechargeable battery economically, the mobile unit 15 can enter a standby mode in which it no longer transmits a UWB signal and/or deactivates reception, for example. In some embodiments, it can leave the stand-by mode automatically. For example, if it has been moved, it can transmit a new location to the manufacturing control system.

In general, one or more of the described sensors can be used individually or in combination for such control procedures. In particular, the sensors for position and acceleration detection are suitable for controlling such changes in the operating mode.

In some embodiments, the mobile unit 15 may have a housing made of one of the following materials or a combination thereof: plastics, metal, and rubber. The housing may also have a protective material such as rubber at its corners and/or edges to prevent damage. The latter can also serve as protection against slipping, e.g., during transport.

The sensors described above provide machine-readable information that is displayed to the operator with process reliability. The display unit of the mobile unit can be used as an information interface. Alternatively, a display of a manufacturing plant or a display specifically provided in the manufacturing hall can be used. The data displayed on the display unit of the mobile unit may not always be able to completely display the entire information content of a workpiece, but the information can be based on the context to display the data necessary for the corresponding manufacturing procedure, for example, the next manufacturing procedure for logistics, part geometry for picking, component tolerances for quality inspection. Display parameters such as size, color, movement, and flashing are suitable means of emphasizing and supporting currently important information.

Furthermore, an LED on the mobile unit can be provided as an exposed element of human-readable information, which can visually communicate information coded by different colors, flashing frequencies, or flashing patterns to the human being. In particular, a flashing LED is easier to detect, even at great distances, than a display 17, for example. For this reason, a signal device such as an LED has special advantages when, for example, a mobile unit 15 is searched for. The mobile unit 15 can be addressed remotely by an operator and then be made to be noticable with a signal device. In addition or alternatively, it can emit a sound signal. Such remote addressing may be carried out, for example, by another mobile unit or by any other particularly portable device, e.g., smartphone, tablet, or by the analysis unit 11. However, it can also be done directly, e.g., via near-field transmitters (e. g., Bluetooth, NFC, IR).

In the context of industrial manufacturing of workpieces in the steel and/or sheet metal processing industry, the mobile units 15 are usually associated with workpieces. Optionally, mobile units can be carried by persons in the manufacturing process or be attached to auxiliary equipment such as transport carriages, machines, and tools, whereby a (spatial and digital) association of the mobile unit with a person, e.g., a worker, or an auxiliary equipment can also be made to support and/or capture processes. The digital association refers to person-specific or resource-specific information.

Figure 3:
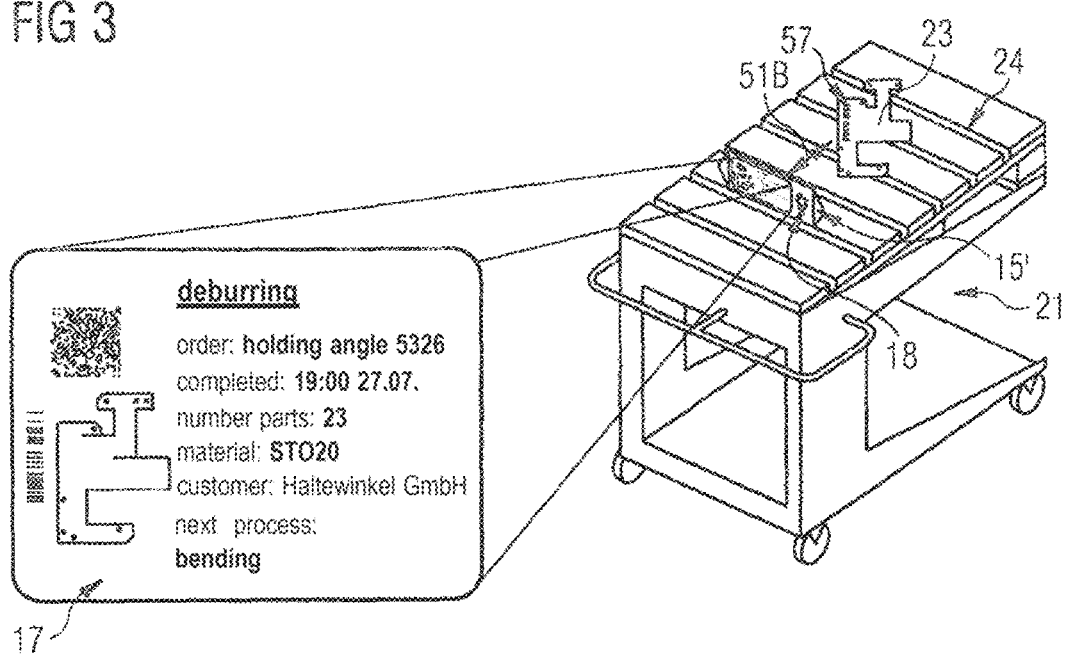
FIG. 3 illustrates an illustration of another exemplary mobile unit on a transport carriage for workpieces.

For example, FIG. 3 shows a transport carriage 21 with a workpiece 23 and a mobile unit 15'. The transport carriage 21 comprises a placing area 24 for that or several such workpieces 23 that have been produced by a machine tool as part of a processing plan. The mobile unit 15', for example, displays information specific to these workpieces 23 on the display 17, which can be retrieved on the basis of the digital association.

The mobile unit 15' is adapted accordingly to receive information about the placed workpieces 23, e.g., from the MES 3 and to output this information to an operator. For example, the mobile unit 15' is configured, for example, to receive information on the number of placed workpieces 23, still missing workpieces, a subsequent processing step, an underlying order (customer), nominal material, etc., and to output the same on display 17. The display 17 can be an e-ink display to save power.

Furthermore, a signal or feedback can be given by activating a signal output device, such as one or more LEDs or an acoustic signal source. In general, such signal output devices are adapted to output feedback signals to an operator.

Furthermore, the mobile unit 15' may have (supplementary) signal input devices. For example, a vibration sensor (e.g., an acceleration sensor) and/or a position sensor can be provided as signal input devices.

Such mobile units can be used as independent units in the production procedure, especially in the form of such combined signal, display, and localizing units. They can be spatially associated with one or more workpieces 23 and then be moved from processing step to processing step/machine tool 7 to machine tool 7 by an operator together with the associated workpieces 23.

Such a mobile unit can also be integrated, in particular in the form of such combined signal, display, and localizing units, in a transport carriage, a pallet, or generally a movable workpiece collecting point unit. Together with these, it can be used as an independent unit in the production process during manufacturing. This unit can then be spatially associated with one or more workpieces 23 (e.g., by being positioned on it) and then be used by an operator to move the associated workpieces 23 from processing step to processing step/machine tool 7 to machine tool 7.

The provision of mobile units for manufacturing can be used in many ways. In the following, exemplary use scenarios are lined out.

The mobile units are located via the transceiver units 13 by runtime analysis. The transceiver units 13 are usually fixed to the hall ceiling, hall walls, machine tools 7, storage structures, etc. The positions of the transceiver units 13, for example, are stored in a digital site plan of the manufacturing hall.

Figure 4:
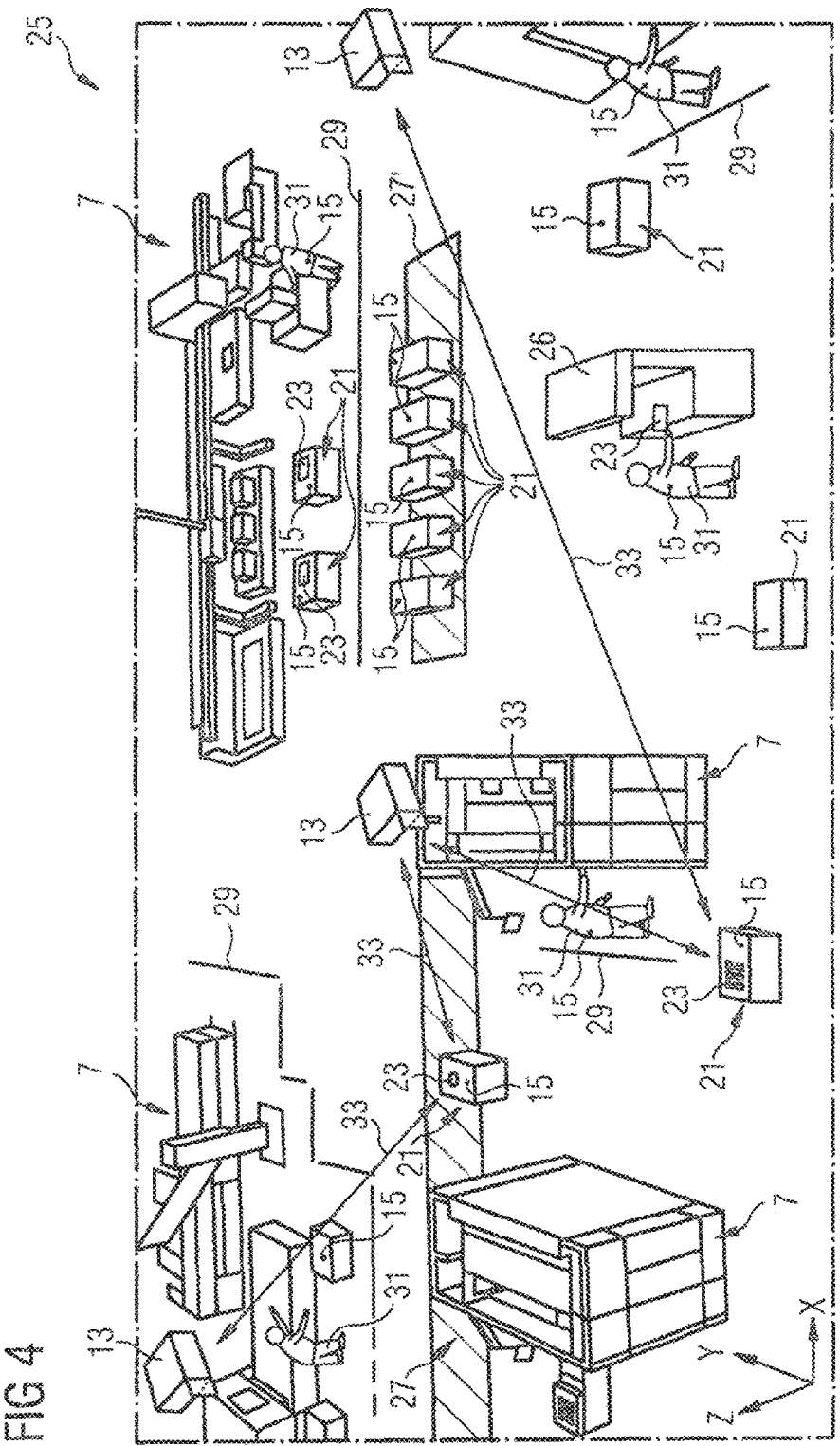
FIG. 4 illustrates an exemplary digital site plan of a manufacturing hall.

FIG. 4 shows a schematic digital site plan 25 of an exemplary manufacturing hall that is equipped with several machine tools 7 of different types. Examples of machine tools 7 in the steel and metal processing industry are cutting machines, in particular laser cutting machines, punching machines, grinding machines, bending machines, etc. The site plan 25 also shows a workstation 26, which is networked to a very small degree, such as a hand-operated workstation with simple machines, e.g., for drilling, sawing, milling, bending, which are not within a network or only are networked via a monitoring system, as it is described, for example, in DE 10 2016 220 015.1. In addition, zones 27, 27' and gates 29 can be seen in the site plan. The zones 27, 27' and the gates 29 were defined by an operator with regard to the use of the machine tools 7 and associated work sequences. The gates 29 extend spatially (for example linearly) within the manufacturing hall and define boundaries whose crossing by a mobile unit can trigger specific actions. The zones 27, 27' and the gates 29 can generally be assigned workpiece-specific or object/operator-specific properties. A view as shown in FIG. 4 can, for example, be shown schematically on a screen (monitor) of a data processing device (e.g., PC). Status information can be displayed when individual zones, gates, or mobile units are activated on the monitor (e.g., using a cursor or for touchpads using a touch). It can be filtered for specific mobile units (e. g., all mobile units with an association to orders of a specific customer). The temperature distribution measured with temperature sensors of the mobile units can be displayed. The status of machines can be displayed, etc.

Thus, actions can be triggered using spatial association in the manufacturing control system when a mobile unit is within a specific zone or crosses a specific gate, whereby these actions can vary depending on the associated workpiece/object and its processing/processing state, generally due to the digital association. The zones 27, 27' and the gates 29 can also be colored on site within the manufacturing hall.

Furthermore, the site plan 25 schematically shows workpiece collecting points, e.g., transport carriage 21 or parts of it, which are located, for example, near a machine tool 7 or within one of the zones 27. One recognizes also schematically operators 31 who operate the machine tools 7.

The digital site plan 25 thus not only shows stationary elements (machine tools), but also moving elements (workpieces, transport carriages, operators) due to the spatial and digital association of the mobile units. The integration of movable elements into the site plan is made possible by the interior localization, for example, by associating the transport carriages 21 and the operators 31 with their own mobile units 15.

Furthermore, exemplary positions of several transceiver units 13 can be seen in the digital site plan 25. The positions are selected in such a way that at least 2 (2D location) or 3 and more (3D location) transceiver units 13 are assigned to an area in the manufacturing hall corresponding to be covered by the interior localization. For example, runtime measurements for moving elements (or the associated mobile units 15) are illustrated using double arrows 33 in FIG. 4.

The primary application of the interior localization system 5 is the localization of workpieces 23, material in general, as well as of mobile units used in manufacturing such as transport carriages 21, forklifts, tools and other mobile devices. The fact that these objects can be localized more easily with the help of the associated mobile unit 15 and by using the location information of the mobile unit, its spatial association and digital association, which essentially only concerns the mobile unit and the type of associated object, reduces or avoids search times. The obtained spatial information about the objects additionally allows an analysis of process flows and of an (efficient) use of, e.g., tools.

The localization can take place in 2D or 3D. If, for example, a 3D site plan of the manufacturing hall is available (as shown in FIG. 4), a vertical localization can be carried out in addition to the primary horizontal localization. Thus, in addition to the x and y coordinates in the horizontal plane, the height coordinate z can also be taken into account. Localization in 3D has specific demands on the transceiver units 13, which cover the area subject to 3D localization, and their positions in the manufacturing hall.

Figure 5:
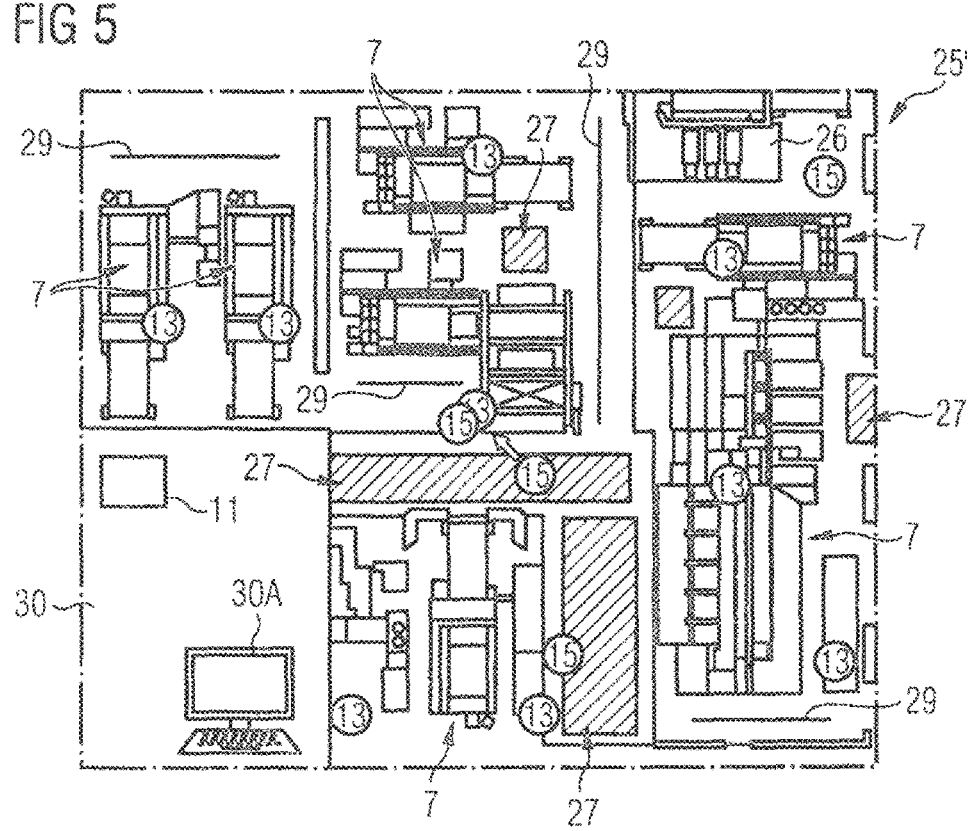
FIG. 5 illustrates another exemplary digital site plan.

FIG. 5 shows a top view of a further digital site plan 25' of a further exemplary manufacturing hall. Several positions of transceiver units 13 (anchors) and several current positions of mobile units 15 (tags) can be seen. Furthermore, several zones 27 and gates 29 can likewise be seen. With the localization system, the positions of the mobile units 15 can be displayed in the site plan 25' and the positions of the mobile units 15 with respect to the zones 27 and the gates 29 can be used for control purposes when processing workpieces. Therefore, it is again necessary to associate a workpiece (or a group of workpieces) or an operator, a means of transport, a tool etc. with a mobile unit 15. In a control area 30, the position of a manufacturing control device of the manufacturing control system 1 is indicated. There, the analysis unit 11 can be located. Here, there can also be a data processing device 30A (e.g., PC) with a screen (monitor), on which, e.g., the digital position plan 25 or 25' shown in FIG. 4 or FIG. 5 is displayed.

In particular, the digital association of a mobile unit with a workpiece (or an object used in manufacturing such as a tool) can be achieved by various interactions with the manufacturing control system 1 (hereinafter also referred to briefly as manufacturing control). For example, with an operator interface of the manufacturing control, which is provided, for example, on a smartphone or tablet, the respective workpiece (or the respective object) can be selected and associated with the specific mobile unit by entering, for example, a respective reference number. Alternatively, after selecting a workpiece (or object) in the user interface, the mobile unit can be associated by activating an input key on the mobile unit (see, e.g., key 19 in FIG. 2) and the associated data exchange of the mobile unit with the manufacturing control system.

Instead of a manual input, for example, the mobile unit can be activated either automatically or semi-automatically by means of a preset movement to activate it, e.g., shaking, tapping, or vibrating of the same. For example, an acceleration sensor additionally provided in the mobile unit can detect such a preset movement. Furthermore, semi-automated association can be achieved by making a specific mobile unit identifiable manually (e.g., by shaking the mobile unit) at a specific location (e.g., at a defined zone 27). The manufacturing control can associate the specific workpiece to be processed with the specific location of, e.g., the shaking. For example, the manufacturing control can also conclude that a mobile unit is linked to a default object (e.g., an empty wheeled carriage) when the mobile unit is shaken at a defined association area (e.g., zone 27' in FIG. 4).

In addition, the association can be done, for example, by means of image processing of an image of the mobile unit, which, for example, is provided with a marking such as a barcode (see display in FIG. 2), and of the associated workpiece/object.

Furthermore, a graphical association can be made via a dialog displayed on the user interface.

Depending on the application, active or inactive mobile units can be used in the localization system. Active mobile units permanently communicate their position to the manufacturing control system cyclically at a desired repetition rate. In general, active, repeatedly (periodically) emitting transmitters are also referred to as "beacons". On the other hand, an inactive mobile unit temporarily does not participate in location detection. This can be the case, for example, if the last presumed location of the mobile unit is known, the associated workpiece is stored for a longer period of time, order processing is suspended, or longer idle times between processing operations are to be expected.

Sensors provided in the mobile unit such as an acceleration sensor, an orientation sensor or a sound sensor can be used to monitor such conditions. Generally, a change from the inactive to the active state can be triggered by (digital) signals or manual manipulation. A manual manipulation can take place, for example, by a targeted vibration of the mobile unit (e.g., manual shaking) or by the beginning of the transport of the workpiece (transfer through a gate 29). For active mobile units, repetition rates can be defined for specific mobile units. Using sets of rules, meaningful behavior patterns can be defined here for each mobile unit or the associated workpiece or an object corresponding to the context information. Context information can include, for example, a zone affiliation, last passed spatial gates, an active processing operation, a current time window (day/night/weekday), and a specific tag family.

In a use scenario, a person, such as an operator, should bend workpieces 23 in accordance with an order. Therefor he accesses data from the manufacturing control system (MES; production control system) and opens, for example, the digital site plan 25, 25' of the manufacturing hall. If the workpieces were provided with a mobile unit 15 (workpiece tag), the location of the workpieces 23 to be bent is shown to that person on the basis of an assigned mobile unit 15 in the site plan 25, 25'. For example, the mobile unit 15 and the workpieces 23 were placed on a transport carriage 21 and the mobile unit 15 was assigned to both the workpieces 23 and the transport carriage 21. Accordingly, the symbol transport carriage can be displayed in the site plan, e.g., together with a schematic shape of the workpiece.

Figure 6:
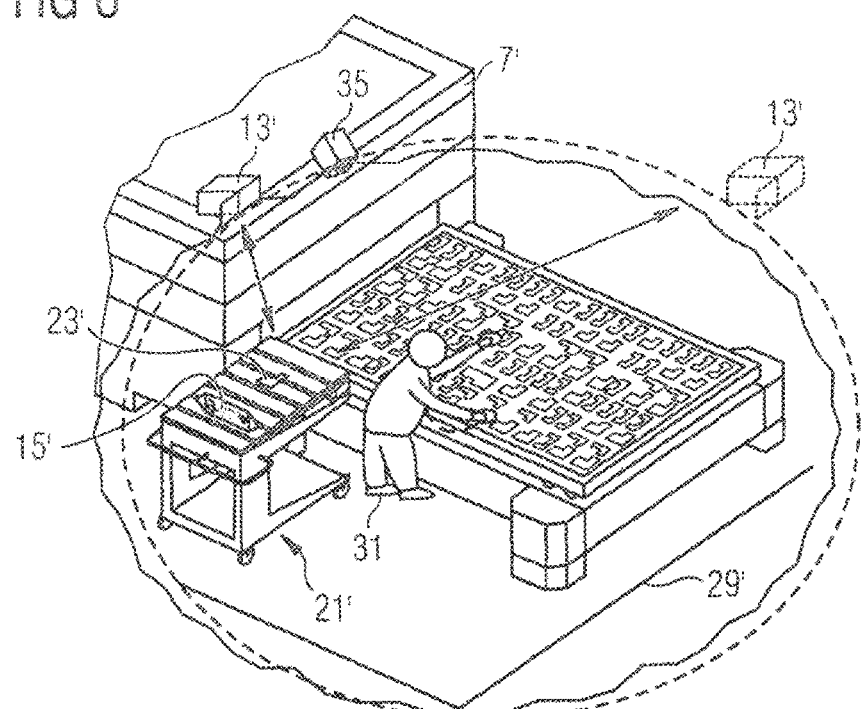
FIG. 6 illustrates an exemplary illustration of a machine tool which is integrated into an interior localization system.

For illustration, FIG. 6 shows a sorting process of an operator 31 who sorts/places the cut material of a laser cutting machine 7' on the transport carriage 21'. A mobile unit 15' was activated according to a specific order (processing plan association) and associated with the workpieces 23' (spatial association). After the sorting process has been completed, for example, the operator 31 can activate a button on the mobile unit 15' so that the manufacturing control system is informed of the completion of the sorting process.

Thus, the operator of the machine tool to be used subsequently knows where the workpieces are to be found in the manufacturing hall (use of the location information of the mobile unit). Once the operator has arrived there, which is detected with the help of a mobile unit carried by the operator and a passage through a gate 29' and that detection being forwarded to the manufacturing control system, if several transport carriages stand closely together, the operator can identify the correct transport carriage as the manufacturing control system automatically activates an LED (signal output device) on the corresponding mobile unit so that it flashes, for example. This optical signal enables the operator to identify the correct transport carriage and take the same with him to the bending workstation. The picking-up of the transport carriage, for example, is passed on to the manufacturing control system as soon as the operator picks up the transport carriage 21' and pushes it over the gate 29'.

The interior localization system also allows indexing of high storage areas in existing buildings. For example, a barometer of the mobile units (3D tag) can be used to identify the height of the mobile unit and thus the "row" in a warehouse. The column of the warehouse can be identified by at least two transceiver units (2D location). When mobile units are present in the warehouse body, the respective storage compartment can be directly stored in the manufacturing control system for a pallet equipped with the mobile unit, for example. Accordingly, an operator can directly find the pallet with indication of the storage compartment. Alternatively, three or more transceiver units can be positioned in the high storage area in such a way that it is also possible to determine a position in three-dimensional space.

Figure 7:
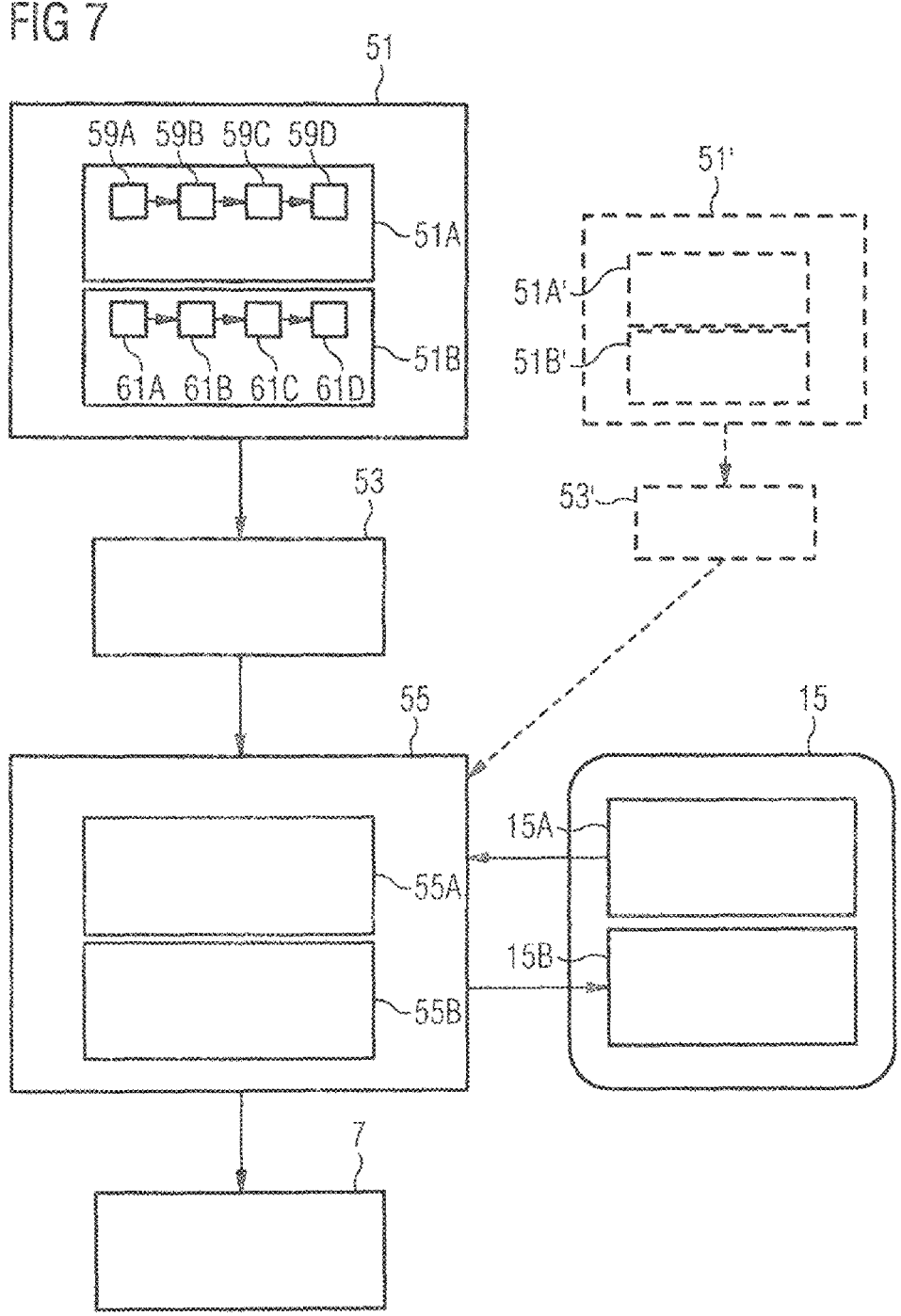
FIG. 7 is a flow chart to illustrate a manufacturing process supported by an interior localization system.

The integration of the manufacturing supported by an interior localization system described herein is summarized in connection with FIG. 7. Hereby additional reference is made to FIGS. 1 to 3 and 6.

FIG. 7 shows exemplary method steps of a method for the manufacturing control of process procedures in the industrial processing of workpieces 23, whereby the method is supported by an interior localization. Accordingly, an interior localization as described above is provided for the method (step 51), and association procedures are carried out to associate a mobile unit 15 with one or more workpieces 23. The association procedures include a mobile unit data association procedure (step 51A)—i.e., the digital association described above—and a spatial association procedure (step 51B)—i.e., the physical association described above.

The mobile unit data association procedure of step 51A is schematically indicated in FIG. 1 within the manufacturing control system 1. Processing plans 37 are stored in the manufacturing control system 1. A processing plan 37 may include—as examples of a processing plan assisting workpiece data set—a geometry data set 37A and/or a code data set 37B identifying the workpiece. Furthermore, the processing plan 37 can include one or more processing and workpiece parameters 37C of the respective workpiece 23. In addition, the positioning system 5 provides mobile unit data sets 39, which are to be associated with the processing plans 37.

For the digital association, an image acquisition device 20, e.g., part of mobile unit 15, may be provided (step 59A). FIG. 2 schematically shows the image acquisition device 20 at the side wall of the mobile unit 15. The image acquisition device 20 can be used, for example, to capture a printout of an order letter with a code or a code 57 on the workpiece 23—as an example of a processing plan-specific object (step 59B). This image is then transmitted with a communication system from the mobile unit 15 to the manufacturing control system 1. In the manufacturing control system 1, the processing plan 37, which includes a corresponding code data set 37B, is identified (step 59C) and is associated with the mobile unit data set 39, which, e.g., belongs to the mobile unit 15 with which the code was captured (step 59D).

Alternatively, this type of digital association can be performed with any imaging device integrated into the manufacturing control system 1, whereby a mobile unit data set of any mobile unit can then be associated with the identified processing plan.

The spatial association can be supported by an assistance system 41, which is provided for a tool machine 7 or generally at a workstation. FIG. 6 shows a machine tool 7 with an optical assistance system that is based on image acquisition with a camera 35 and supports the association of a workpiece with a mobile unit. Mobile units to which processing plans were associated as part of a preceding digital association (step 51A) are provided.

During assisted spatial association, camera 35 detects a sorted workpiece 23 (step 61A) and generates a measurement assisting workpiece data set 41A (step 61B). The measurement assisting workpiece data set 41A is compared with the geometry data sets 37A of the processing plans 37 in the manufacturing control system 1 (step 61C) to identify the processing plan 37 that belongs to the detected workpiece. The manufacturing control system 1 can now, for example, stimulate the identified mobile unit to emit a signal (LED flashing, sound generation, . . . ) to simplify manual spatial association. As an alternative or in addition, the manufacturing control system 1 can, within the framework of an automated combination of mobile unit 15 and detected workpiece 23, cause the detected workpiece 23 to be placed at a location of the identified mobile unit 15 (step 61D).

After the association has been completed, the position of the associated workpiece 23 is determined by localizing the associated mobile unit 15 with the interior localization system 5 (step 53). The determined position of the associated mobile unit 15 is now integrated into the control of the industrial manufacturing plant for manufacturing the end product (step 55). In addition or alternatively, a position of a tool, a person, a means of transport, a machine tool, and/or a workpiece collecting point unit can be determined (steps 51', 51A', 51B', 53') and integrated into the control of the industrial manufacturing plant.

The integration may include, for example, defining (step 55A) zones 27 and/or spatial gates 29 in the manufacturing hall, in particular in a site plan 25, 25' of the manufacturing hall, and comparing (step 55B) the determined position with respect to zones 27 and/or spatial gates 29.

In the site plan of the manufacturing hall, a zone (machine tool zone) can be created in step 55A around machine tools/working stations, for example around the bending machine. This zone can be defined as a volumetric body (3D zone) that, for example, extends up to a height of 1.5 m above the hall floor. If a transport carriage with workpieces and an associated mobile unit (carriage tag) with workpieces belonging to an order is moved into this zone, the manufacturing control system registers this in step 55B.

The manufacturing control of process flows can include the possibilities of integrating the mobile unit discussed herein. For example, an additional transmission of signals may take place between the manufacturing control system 1 and the mobile unit 15 to exchange information. The signals may be generated by a signal input device 15A of the mobile unit 15—e.g., a sensor, a button 19, or the image acquisition device 20—or by signal output devices 15B of the mobile unit 15—e.g., a display unit 17, an LED or a loudspeaker.

Furthermore, the manufacturing control of process flows via the manufacturing control system 1 can control processing parameters on the machine tools 7 or generally set manufacturing parameters, which can also refer to the manufacturing hall or to a subsequent data analysis, for example.

As a further example of an integration into the manufacturing control system, the manufacturing control system can use the digital association of step 51A to register the respective processing order at the processing station (e.g., at the bending machine). Furthermore, further secondary actions can be initiated automatically. In this way, an associated processing program can be automatically loaded into the machine tool. This can allow the machine tool (e.g., a bending machine) to be set up automatically via a tool master. On an associated screen, an operator can see the information required for the upcoming processing operation. For example, an illustration of the original shape of the workpiece as well as the bent shape of the workpiece, the number of workpieces to be bent, and/or the subsequent processing operation, etc. can be displayed.

One advantage of processing in connection with defined zones and gates is that the operator does not have to do anything other than to bring the workpieces marked with the associated mobile unit into the associated machine tool zone, whereby the various preparatory measures were initiated automatically. As already mentioned, the machine tool can, for example, immediately be automatically set to the new order to be processed. This can save a considerable amount of time and errors can be avoided.

When the operator starts processing the workpieces of the order (e.g., bending), he can take the mobile unit and attach it to active components of the machine tools, e.g., the bending beam. There a further zone (booking zone) is defined, which automatically takes the order into processing and forwards it to the manufacturing control system. For example, the bending processes carried out can be monitored and stored for the order. When all workpieces were processed (bent), the mobile unit is removed from the booking zone, so that the order can be booked as completely executed in the manufacturing control system, for example.

Again, using the mobile unit in a localization system can save considerable time, as the operator does not have to make complicated bookings at a terminal.

When a mobile unit interacts with the manufacturing control system or when an operator operates additional functions (input keys, etc.) of a mobile unit, the operator can receive feedback or messages from the mobile units via output means such as RGB LED, vibration, displayed text, or sound. For example, the status of a mobile unit or an associated order can be visualized, for example, by an LED lighting green as long as the order is in the processing state. In addition, feedback or a message can be given to subsequent processing stations. For example, the automatic booking of a completed processing operation can alert the subsequent process to the fact that the parts are now ready and where they are. In general, the triggering of actions such as booking via zones can be further enhanced so that, for example, workpieces can be time-monitored during the various processing procedures.

If, in addition to the location position, the position in space of a mobile unit is measured, it can be determined, for example, whether a specific mobile unit is horizontal or upright. This allows further interaction with the manufacturing control system. For example, a carriage with workpieces of several orders (i.e., several different workpieces that are, for example, to be processed differently) and several mobile units can be pushed into a zone. If not all orders are to be processed at the same time, a specific order, which, for example, is to be processed first, can be communicated to the manufacturing control system by a vertical position of the corresponding mobile unit.

Another possibility to give feedback to the manufacturing control system via the mobile unit is the already mentioned shaking of the mobile unit or the execution of specific gesture-like movements.

It is also possible to trigger events or display upcoming events based on the number of mobile units located in one or more zones (e.g., currently active and/or inactive mobile units). For example, picking processes or transport tasks can be triggered.

In addition to stationary zones, zones can also move dynamically with one or more mobile units. This allows, for example, the transport of several load carriers (transport carriages), and the orders carried along can be treated together as a cluster by the manufacturing control system.

Furthermore, a mobile unit can, for example, be attached to a handwork tool (tool tag) (spatial association) and digitally associated with the tool itself so that it can be located more easily. In addition, an acceleration sensor provided in such a tool tag can be used to determine when and/or how the manual tool is used.

By determining the position of the tool, it is also possible to measure the movement of the tool through space (trajectory information/evaluation). This can be used to generate information about how many parts have been machined, whether a machining step has been forgotten, etc.

Furthermore, further data can be transmitted via the localization system, e.g., error messages by corresponding movement patterns of a mobile unit, e.g., in a defined error zone.

Another use scenario concerns the recording of process states, which are characterized by the positions of workpieces, people, machines, and other resources and which can be recorded by a cognitive evaluation of these measured positions. In general, the location and sensor data as well as the information regarding zones and gates allow a multitude of evaluation options. For example, such raw data can be used to generate key figures such as key performance indicators (KPIs) and perform detailed analyses to optimize manufacturing processes. These analyses (e.g., KPIs) can be displayed as heat maps, live views, or in aggregated form. Additional evaluation diagrams such as spaghetti diagrams can thus be called up immediately for various processing operations. This makes it possible to make standard key figures available at the push of a button, such as throughput time, value stream analysis, etc., whereby the key figures often generate a great deal of effort during the collection process. In addition, the processes in production can be improved on the basis of the location information obtained with the aid of numerical optimization procedures.

The use of the localization system also allows people to be located if they carry a mobile unit (person-tag). In addition to workpieces and tools, the localization of persons (as a whole or also local localizations of leg, arm, and hand) provides valuable information about processes in production. Related use scenarios concern, for example, the monitoring of safety-critical areas for the protection of persons, in particular the operators. In addition, motion patterns can be generated, which in turn can be evaluated, for example, to improve the process or ergonomics of the operator's workstations. In particular, the synchronous evaluation of both hands of one person, especially of an operator or worker, allows detailed information about the manufacturing process and the workpiece to be recorded. Thus it can be recorded that:
- an operator has grasped something at a position X;
- an operator has transported a specific workpiece from A to B;
- an operator has placed a specific part at a position Y;
- a manufacturing operation such as drilling, press-fitting, . . . has been carried out x times;
- a manufacturing process such as deburring, welding, . . . was carried out on a specific trajectory for a workpiece; and/or
- a joining process has been carried out at a specific position.

Different mobile units can stand in specific relationships to each other. For example, such mobile units can be grouped into families of mobile units as part of a specific manufacturing process in order to define basic (behavioral) patterns for a certain number of mobile units. Families can, for example, be assigned to an order, an assembly, a subsequent process of workpieces, or an associated load carrier (transport carriage, pallet, collecting container). The family affiliation can be changed dynamically during the current processing flow. Mobile units can, thereby, belong to different families at the same time. Furthermore, families of mobile units can concern a specific connection, for example, all load carriers, all means of transport, all workers, all workpieces, all machines, etc., or a family of mobile units can concern a specific status of a mobile unit, for example, a load status of the mobile units.

Accordingly, the analysis as well as the collection of process states can be based on the evaluation of such families of mobile units.

The extension disclosed herein of a manufacturing plant with an interior localization and interfaces to the manufacturing control system can be used to determine the position of workpiece collecting point units and/or to record movements of an operator's hand. Such a localization via an ultra wideband system can be built from four or more "anchors" and one or more "tags". The anchors serve as receivers and can be positioned stationarily around the working area. The tags are attached, for example, to all workpiece collecting point units, for example, to the operator's hand, and serve to determine the position of the same. Other interior localization systems include Bluetooth, WiFi, infrared and RFID, for example.

When the workpiece collecting point unit is integrated into a localization system, a localization can be made possible by means of transmitter-receiver systems with a corresponding system in the machine tool hall, in which several processing machines and/or workplaces are provided.

An operator who monitors and controls the processing operation in a control center can see on his monitoring monitor where a specific order is currently located in the process chain and what its status is. Accordingly, he can also directly access the display unit in order to set displayed data (workpiece information) such as preferences, work steps, etc. Alternatively or additionally, this can also be done on site with an input device at the workpiece collecting point unit (e.g., push-button, switch, touchpad) or via a data interface, which gives access to an external, e.g., mobile input unit (Smartphone, iPad, Smartwatch, etc.). Accordingly, the workpiece collecting point unit has, for example, a near-field radio network (Bluetooth, NFC). This can also be used, for example, as part of a near-field localization system to locate the workpiece collecting point unit. The latter makes it easier to find a workpiece collecting point unit if, for example, it is hidden in a large number of workpiece collecting point units. For example, the workpiece collecting unit is specifically controlled so that the signal device (e. g., a brightly lit LED) is activated.

Near-field localization can also be used, for example, in sorting by localizing the location of, e.g., a hand (especially an intelligent glove that interacts with the localization system) from the workpiece collecting point unit. If the "hand" of an operator removes a component from the residual grid, the component's location is booked in the MES from the residual grid to the hand. If the hand moves near a localization system of the workpiece collecting point unit, it is booked in the MES that this part was placed at the corresponding workpiece collecting point unit. On one hand, the localization system can detect that the hand came close to the workpiece. On the other hand, a higher-level system (e.g., the MES) can link the workpiece collecting point unit and the position of the hand.

Figure 8:
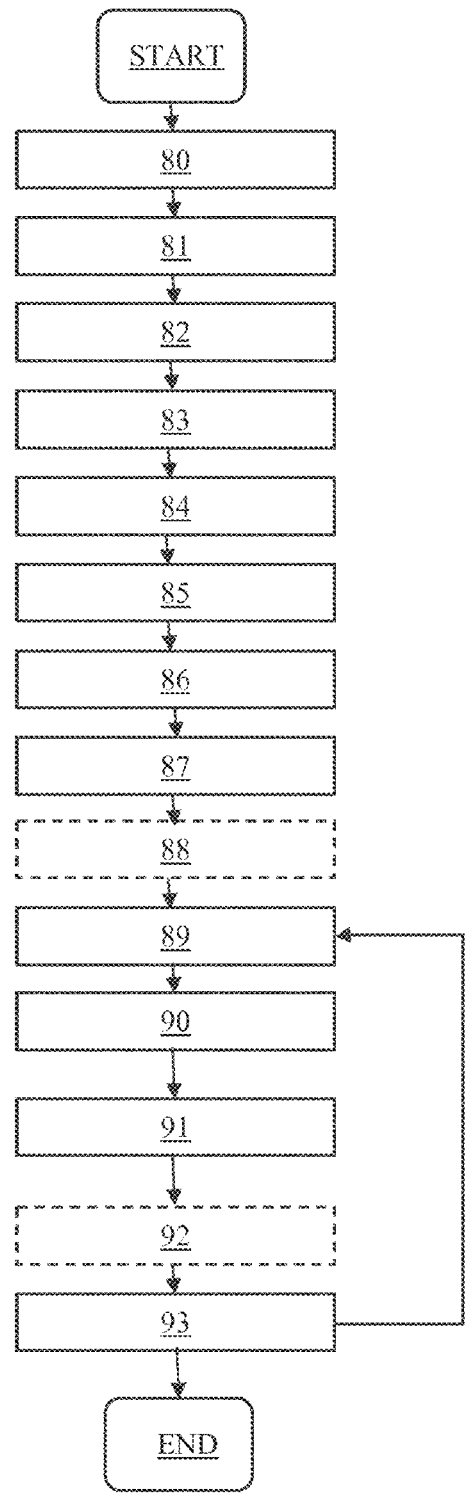
FIG. 8 is a flow chart to illustrate process steps for the industrial manufacture of an end product.

FIG. 8 shows exemplary method steps of an industrial manufacturing of an end product, which can be carried out with a manufacturing control system, in particular the MES 3, disclosed herein.

In a first step 80, a manufacturing order (with a processing plan 37) for the manufacture of an end product from a workpiece 23 is received by the MES 3, which is implemented, for example, in a data processing device 30A. In a subsequent step 81, the selection of individual processing steps is carried out using the MES 3. In a further step 82, the selection of a sequence is carried out by the MES 3 (or an operator) in which the processing steps are to be carried out. The processing steps can be one or more of the following: cutting, in particular laser cutting, punching, bending, drilling, threading, grinding, joining, welding, riveting, screwing, pressing, edge and surface treatment.

In a further step 83, each of the processing steps is associated with a machine 7 or a workstation unit. The workstation unit can be a workstation 26 as described above, in particular a manually operated workstation.

In a further step 84, the manufacturing order is associated with a mobile unit data set 39, which is stored in the MES 3 for a mobile unit. This step 84 may correspond to step 51A shown in FIG. 7. Step 84, in particular, can also be carried out earlier, e.g., after one or more of the method steps described above.

In a further step 85, a workpiece 23, which is at least partly a part of the end product, is manufactured, especially after a first of the processing steps at the machine 7 or at the workstation unit associated with this processing step has been performed. Here, for example, a part of the manufacturing order is cut from a sheet metal. As a subsequent processing step may also require milling or punching, this workpiece 23 can form even more material than the end product, i.e., be only partially the end product or a part of it.

In a further step 86, the spatial association of the mobile unit 15, which is associated with the manufacturing order, with the manufactured workpiece 23 takes place. This step 86 can correspond to step 51B shown in FIG. 7. In a further step 87, a change in the status of the manufacturing order is stored in the MES 3.

In an optional step 88, the position of the mobile unit 15 is stored in relation to the production order.

In a further step 89, the workpiece 23 is transported together with the mobile unit 15 according to the manufacturing order to the next machine 7 or the next workstation unit in the preset sequence. This can be done as a result of an instruction from the MES 3 by a person or by an automated transport process.

In a further step 90, the current processing step (e.g., the first step of a subsequent step of the processing steps) is carried out at the machine 7 or workstation unit assigned to it.

In an optional step 91, the position of the mobile unit 15 is stored for the manufacturing step in the manufacturing order.

In a further step 92, a change in the status of the manufacturing order is stored again in the MES 3.

In a further step 93, it is decided whether to continue with the method step 89, that is, a transport to a further processing step, or whether the manufacturing has been completed.

During these manufacturing steps, it is always possible to localize the mobile unit 15 using the localization system 5 on the basis of electromagnetic signals controlled by the MES 3. This means that the MES 3 can have access to data such as the current status and location of the workpiece 23 at any time. The MES 3, the mobile unit 15, and the localization system 5 can in particular be configured as described above.

All the method steps described above, carried out by a manufacturing control, a manufacturing control system, a localization system or by the MES 3, may also be carried out by means of one or more data processing devices having means for carrying out the method steps.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method of controlling industrial processing of workpieces from steel or sheet metal in a manufacturing hall to manufacture an end product, the method comprising:
    providing an interior localization system comprising a plurality of fixed transceiver units permanently installed in the manufacturing hall, at least one mobile unit, and an analysis unit, wherein the interior localization system comprises an ultra-wideband (UWB) communication technology and wherein the at least one mobile unit is configured to receive and transmit UWB electromagnetic signals from and to one or more of the plurality of fixed transceiver units of the interior localization system;
    associating the at least one mobile unit with at least one workpiece;
    determining, by the analysis unit in the interior localization system, a position of the at least one workpiece in the manufacturing hall by localizing the associated mobile unit from runtimes of the UWB electromagnetic signals travelling between at least two of the plurality of fixed transceiver units and the mobile unit; and
    integrating the determined position into a manufacturing control system of an industrial manufacturing plant to manufacture the end product, wherein the industrial manufacturing plant comprises the manufacturing hall.

2. The method of claim 1, wherein the mobile unit includes a sensing element comprising at least one of an acceleration sensor, a position sensor, a MEMS-based sensor, and a barometer sensor, wherein the method further comprises integrating a signal from the sensing element into the manufacturing control system for manufacturing the end product, [ ] wherein the sensing element provides a movement signal or an orientation signal used to determine the position of the at least one workpiece associated with the mobile unit.

3. The method of claim 2, wherein the signals are generated by shaking the mobile unit, by orienting the mobile unit in specific orientations, or by performing specified gestures using the mobile unit.

4. The method of claim 1, wherein the mobile unit includes a signal input device, and the method further comprises:
    inputting information for processing the position of the at least one workpiece with the signal input device.

5. The method of claim 1, further comprising:
    receiving image information of the at least one workpiece or the mobile unit; and
    evaluating the image information for a mark, a barcode, or an image on the at least one workpiece.

6. The method of claim 1, wherein the mobile unit includes a signal output unit, and the method further comprises:
    outputting, by the signal output unit, information to process the at least one workpiece, the information comprising data about a number of workpieces, missing workpieces, a subsequent processing step, an underlying order, a customer, or a desired material, wherein the signal output unit is selected from the group consisting of: an optical signal unit, an acoustic signal unit, and a vibration signal unit.

7. The method of claim 1, further comprising:
    associating the mobile unit with an operator, transport device, machine tool, or tool;
    determining, by the interior localization system, the position of the mobile unit; and integrating the determined position of the mobile unit into the control system for manufacturing the end product of the industrial manufacturing plant, or into a motion analysis of the associated operator, transport device, machine tool, or tool.

8. The method of claim 1, further comprising:
defining zones or spatial gates in the manufacturing hall; and
comparing the determined position to the zones or to the spatial gates to control manufacturing the end product based on the comparison.

9. The method of claim 8, wherein comparing the determined position to the zones or to the spatial gates results in determining that the mobile unit is located in a zone or has left the zone, or has passed a spatial gate.

10. The method of claim 1, wherein in response to integrating the determined position into the manufacturing control system, the method further comprises one or more of:
transmitting signals to support localization;
displaying information of manufacturing status on a graphical user interface of a mobile output device;
setting operating parameters of a machine tool that processes the at least one workpiece to manufacture the end product;
updating a protocol that logs manufacturing processing steps;
associating the mobile unit with an order of manufacturing one or more end products in several different manufacturing processes; and
controlling and/or monitoring:
a processing of the at least one workpiece in a plurality of different manufacturing processes performed at different locations;
a transport of the at least one workpiece between different manufacturing processes performed at different locations;
a processing of the at least one workpiece at workstations linked to or integrated into the manufacturing control system; and
a processing of the at least one workpiece at workstations that are separate from the manufacturing control system.

11. An interior localization system to control process procedures in an industrial production of workpieces from steel or sheet metal in a manufacturing hall, the interior localization system comprising:
a plurality of fixed transceiver units permanently installed in the manufacturing hall that comprises one or more machines for processing steel or sheet metal;
at least one mobile unit that during use is associated with one or more workpieces in the manufacturing hall; and
an analysis unit,
wherein the plurality of fixed transceiver units and the at least one mobile unit are configured to transmit and receive ultra-wideband (UWB) electromagnetic signals, and wherein the analysis unit is configured
to determine runtimes of the UWB electromagnetic signals travelling between two or more the plurality of fixed transceiver units in the manufacturing hall and the at least one mobile unit, and
to determine a position of the at least one mobile unit and any workpiece associated with the mobile unit in the manufacturing hall based on the runtimes of the UWB electromagnetic signals.

12. The interior localization system of claim 11, wherein the at least one mobile unit has a display unit adapted to display at least one of
information of the one or more respective workpieces, and
a position of the at least one mobile unit in a site plan of the manufacturing hall.

13. The interior localization system of claim 11, wherein the interior localization system is part of a manufacturing control system for controlling manufacturing processes in the manufacturing hall,
wherein the interior localization system is configured to provide data on a position of the at least one mobile unit in the manufacturing hall, and
wherein the manufacturing control system is configured to associate the position of the at least one mobile unit with a position of at least one workpiece and to use the position of the at least one workpiece in controlling the manufacturing processes.

14. The manufacturing control system of claim 13, further comprising:
a display unit configured to display the position of the at least one mobile unit in a site plan of the manufacturing hall.

15. The method of claim 1, wherein the mobile unit comprises its own time determining unit to determine runtimes, the method further comprising determining a position of the mobile unit from the runtimes of the electromagnetic signals travelling between the transmitters and the mobile unit.

16. The method of claim 15, wherein the position of the mobile unit is determined with an accuracy of less than 30 cm.

17. The interior localization system of claim 11, wherein the at least one mobile unit is an electronic component capable of communicating with the transceiver units by UWB communication technology and comprising a time determining unit to determine runtimes of the UWB electromagnetic signals.

18. The interior localization system of claim 11, wherein the mobile unit is configured to be attached to or be placed onto the workpiece or a group of workpieces.

* * * * *